(12) United States Patent
Staton et al.

(10) Patent No.: US 7,564,348 B2
(45) Date of Patent: *Jul. 21, 2009

(54) METHOD AND SYSTEM TO MONITOR MOVABLE ENTITIES

(75) Inventors: Houston Staton, Torres Mercedes Piso (CR); James Ashley, Sr., Anaheim, CA (US); James Ashley, Jr., Norco, CA (US); Frank Mooney, Brea, CA (US); Patrick Mooney, Brea, CA (US); Edward Lang, Diamond Bar, CA (US); Charles Maggs, Costa Mesa, CA (US); German Santos, Anaheim Hills, CA (US)

(73) Assignee: Wirelesswerx International, Inc. (PA)

( * ) Notice: Subject to any disclaimer, the term of this patent is extended or adjusted under 35 U.S.C. 154(b) by 658 days.

This patent is subject to a terminal disclaimer.

(21) Appl. No.: 11/105,621

(22) Filed: Apr. 13, 2005

(65) Prior Publication Data

US 2006/0099959 A1 May 11, 2006

Related U.S. Application Data

(60) Provisional application No. 60/625,467, filed on Nov. 5, 2004.

(51) Int. Cl.
*G08B 1/08* (2006.01)
(52) U.S. Cl. .............................. 340/539.13; 340/539.26; 340/573.4; 340/825.49; 340/5.92; 340/10.1; 340/572.1; 340/572.4; 455/456.1; 455/456.4; 701/200; 701/206; 701/208

(58) Field of Classification Search ............ 340/539.13, 340/539.26, 573.4, 825.49, 5.92, 10.1, 572.1, 340/572.4; 455/456.1, 456.4; 701/200, 206, 701/208
See application file for complete search history.

(56) References Cited

U.S. PATENT DOCUMENTS 3,518,674 A 6/1970 Moorhead et al.

(Continued)

FOREIGN PATENT DOCUMENTS

DE 19960219 7/2001

(Continued)

OTHER PUBLICATIONS

International Search Report for International Application No. PCT/US2005/037529 Dated Mar. 6, 2006.

(Continued)

*Primary Examiner*—Tai T Nguyen
(74) *Attorney, Agent, or Firm*—Greenburg Traurig, LLP

(57) ABSTRACT

A method to wirelessly monitor an entity having an attached transponder is disclosed. A geographical zone is defined. The geographical zone can be defined by allowing a user to define and load to a transponder a plurality of waypoints, each waypoint defined by a geographical coordinate and a radius originating from the geographical coordinate. The geographical zone can also be defined by selecting a plurality of coordinates that are loaded to a transponder and mapped on a pixilated image. The microprocessor in the attached transponder is programmed to determine the occurrence of an event associated with the status of the entity in relation to the geographical zone. The microprocessor in the transponder is also configured to transmit the data related to the occurrence of an event from the attached transponder to a user.

34 Claims, 25 Drawing Sheets

U.S. PATENT DOCUMENTS

| | | |
|---|---|---|
| 3,772,668 A | 11/1973 | Smith |
| 4,217,588 A | 8/1980 | Freeny, Jr. |
| 4,224,596 A | 9/1980 | Knickel |
| 4,688,026 A | 8/1987 | Scribner et al. |
| 4,884,208 A | 11/1989 | Marinelli et al. |
| 5,142,281 A | 8/1992 | Park |
| 5,365,516 A | 11/1994 | Jandrell |
| 5,627,517 A | 5/1997 | Theimer et al. |
| 5,917,405 A | 6/1999 | Joao |
| 6,009,330 A * | 12/1999 | Kennedy, III et al. ....... 455/445 |
| 6,014,089 A | 1/2000 | Tracy et al. |
| 6,043,748 A | 3/2000 | Touchton et al. |
| 6,055,426 A | 4/2000 | Beasley |
| 6,236,358 B1 | 5/2001 | Durst et al. |
| 6,421,001 B1 | 7/2002 | Durst et al. |
| 6,496,575 B1 | 12/2002 | Vasell et al. |
| 6,509,830 B1 | 1/2003 | Elliott |
| 6,617,969 B2 | 9/2003 | Mi et al. |
| 6,665,613 B2 | 12/2003 | Duvall |
| 6,674,368 B2 | 1/2004 | Hawkins et al. |
| 6,717,513 B1 | 4/2004 | Shprecher et al. |
| 6,812,824 B1 | 11/2004 | Goldinger et al. |
| 7,138,916 B2 | 11/2006 | Schwartz et al. |
| 2001/0040513 A1 | 11/2001 | McDonald |
| 2002/0147006 A1 | 10/2002 | Coon et al. |
| 2002/0196151 A1 | 12/2002 | Troxler |
| 2003/0149526 A1 | 8/2003 | Zhou et al. |
| 2003/0163287 A1 | 8/2003 | Vock et al. |
| 2004/0196182 A1 * | 10/2004 | Unnold .................. 342/357.07 |
| 2004/0201454 A1 | 10/2004 | Waterhouse et al. |
| 2005/0159883 A1 | 7/2005 | Humphries et al. |
| 2006/0015233 A1 | 1/2006 | Olsen, III et al. |
| 2006/0109107 A1 * | 5/2006 | Staton et al. ........... 340/539.13 |

FOREIGN PATENT DOCUMENTS

| | | |
|---|---|---|
| EP | 0915398 | 5/1999 |
| EP | 1345148 | 9/2003 |
| GB | 2369966 | 6/2002 |
| WO | WO0041428 | 7/2000 |
| WO | WO0135190 | 5/2001 |
| WO | WO0146926 | 6/2001 |
| WO | WO0163318 | 8/2001 |
| WO | WO03049060 | 6/2003 |

OTHER PUBLICATIONS

International Search Report for International Application No. PCT/US2005/037526 Dated Apr. 25, 2006.

* cited by examiner

FIG. 10B

METHOD AND SYSTEM TO MONITOR MOVABLE ENTITIES

CROSS-REFERENCE TO RELATED APPLICATIONS

This application claims the benefit of the prior filing date of U.S. provisional patent application No. 60/625,467, filed Nov. 5, 2004, herein incorporated by reference in its entirety. This application is related to U.S. Utility patent application Ser. No. 11/105,931 filed on Apr. 13, 2005, entitled "METHOD AND SYSTEM TO CONFIGURE AND UTILIZE GEOGRAPHICAL ZONES"; and U.S. Utility patent application Ser. No. 11/105,932 filed on Apr. 13, 2005, entitled "METHOD AND SYSTEM TO CONTROL MOVABLE ENTITIES"; both of which have been filed concurrently and are incorporated by reference in its entirety.

FIELD OF THE DISCLOSURE

The disclosure relates to monitoring movable entities. In particular, it relates to systems and methods to remotely control and monitor movable entities functions and positioning data in relation to pre-configured geographical zones.

BACKGROUND OF THE DISCLOSURE

Vehicle tracking systems have become increasingly popular and more economically accessible to businesses and individuals. Most tracking locator systems utilize ground positioning system (GPS) technology. GPS vehicle tracking systems have diverse applications such as cargo transportation, public transportation, personal tracking, investigations of enforcement agencies, and others.

In fleet management, GPS vehicle tracking systems allow increasing fleet efficiency, reducing operating costs such as fuel costs, and supervising the correct operation of deliveries, pick-ups, and routes associated with fleet operation.

In personal tracking, individuals use GPS vehicle tracking information to obtain the shortest or fastest path to a destination, their current location in relation to another location, etc. Furthermore, personal tracking systems allow users to track vehicles that have been entrusted to another person. Likewise, enforcement agencies may use GPS vehicle tracking systems to locate patrol vehicles as well as to recover stolen vehicles.

While current GPS vehicle tracking systems provide benefits such as increased productivity and safety, these benefits are yet to be maximized. Current systems are limited to relaying the GPS information to a control center or a web server and plotting the position of the vehicle on a computer map.

SUMMARY OF THE DISCLOSURE

The present disclosure provides a system and method that allows a user to monitor vehicles and other moving entities by using preconfigured geographical zones.

In one aspect, there is a method to wirelessly monitor an entity having an attached transponder. A plurality of coordinates is loaded from a computing device to a memory in an attached transponder. A microprocessor in the attached transponder is programmed to define a geographical zone using said plurality of coordinates to create an enclosed area on a pixilated image, wherein said enclosed area is representative of a geographical zone. The microprocessor in the attached transponder is programmed to determine the occurrence of an event associated with the status of the entity in relation to the geographical zone. The microprocessor in the transponder is also configured to transmit the data related to the occurrence of an event from the attached transponder to a user. The status of the entity is based upon movement of the entity, position of the entity and non-movement of the entity.

In one aspect, the event can be leaving a geographical zone, entering a geographical zone, turning on an ignition to the entity, turning off the ignition to the entity, change of speed of the entity, change of temperature of an engine of the entity, change of internal temperature of the entity, change of fuel level in a fuel tank of the entity, locking of a door or latch of the entity, unlocking of the door or latch of the entity, opening a window of the entity, closing a window of the entity, opening a door of the entity, closing of a door of the entity, pushing a button connected to the entity in relation to an emergency, reaching a predetermined distance traveled, reaching a predetermined time traveled, reaching a predetermined time, reaching a predetermined date, reaching a maximum speed threshold, reaching a maximum time permitted to maintain a status of being over the speed threshold, reaching a maximum a acceleration threshold, reaching maximum length of idle of a vehicle, change of the power level of the battery, a bar code scanned by a connected scanner, passenger loading or unloading, cargo loading or unloading, vehicle part malfunction, vehicle diagnostics code received, impact detected, airbag deployed, seatbelts latched, seatbelts unlatched, or change of tire air pressure.

In one aspect, the data transmitted from the attached transponder is the speed of the entity, direction of movement of the entity, state of an electrical input to the entity, state of an electrical output of the entity, or geographical position of the entity. The data transmitted from the attached transponder can be communicated to a control center or to a portable device.

In another aspect, the enclosed area on a pixilated image is formed by assigning each pixel is to a coordinate and configuring the distance between each assigned pixel. In another aspect, the enclosed area is created by connecting a plurality of assigned pixels by lines, wherein a series of contiguous and connected lines enclose an area in the pixilated image and wherein said pixels that lie on the lines are turned on in order to form a contiguous array of pixels that enclose a shape in the pixilated image.

In one aspect, there is a method to wirelessly monitor an entity having an attached transponder. A geographical zone is defined using a plurality of waypoints, wherein each waypoint is defined by a geographical coordinate and a radius originating from the geographical coordinate. A computing device is loaded to the attached transponder's memory a plurality of waypoints. A microprocessor in the attached transponder is programmed to determine the occurrence of an event associated with the position of the entity in relation to the geographical zone. The microprocessor in the transponder is also configured to transmit the data related to the occurrence of an event from the attached transponder to a user.

In another aspect, the geographical coordinate is represented by a latitude and longitude, and the radius is represented by a distance magnitude. The attached transponder can determine whether the attached transponder is inside or outside the geographical zone by obtaining global positioning coordinates, and calculating whether the global positioning coordinates are inside at least one waypoint of the plurality of waypoints. Furthermore, the shape of the geographical area is the shape of the border delimiting a street route, a state, a city, a county, or a country.

In another aspect, all waypoints in the plurality of waypoints have the same coordinate but different radii, such that all the waypoints in the plurality of waypoints are concentric.

In one aspect, there is a method to wirelessly monitor an entity having an attached transponder. The method comprises using a computing device to identify a geometrical area using at least two coordinate attributes, wherein said geometrical area is divided into a grid having at least one section, defining a geographical zone by selecting within the grid the at least one section representative of a desired area and correlating at least one section into a pixilated computer image by associating at least one section to a pixel, loading said pixilated computer image into the attached transponder's memory, programming a microprocessor in the attached transponder to determine the occurrence of an event associated with the position of the entity in relation to the geographical zone, and configuring the microprocessor in the transponder to transmit the data related to the occurrence of an event from the attached transponder to a user.

In another aspect, the geometrical area is rectangular and is divided into a plurality of rectangles. The geometrical area can also be circular and be divided into a plurality of sections.

In one aspect, there is a method to wirelessly control an entity having an attached transponder. The method comprises loading from a computing device to the transponder's memory a plurality of coordinates, programming a microprocessor of a transponder to define a geographical zone by creating an enclosed area on a pixilated image using said plurality of coordinates, wherein said enclosed area is representative of a geographical zone, and programming a microprocessor in the transponder to transmit data to a control center upon receiving a command from the control center, the data being associated with the status of the entity in relation to the geographical zone.

In one aspect, there is a method to wirelessly control an entity having an attached transponder. The method comprises defining a geographical zone using a plurality of waypoints, wherein each waypoint is defined by a geographical coordinate and a radius originating from the geographical coordinate, loading from a computing device to the transponder's memory a plurality of waypoints, and programming a microprocessor in the transponder to transmit data to a control center upon receiving a command from the control center, the data being associated with the status of the entity in relation to the geographical zone.

In another aspect, there is a method to wirelessly control an entity having an attached transponder. The method comprises using a computing device to identify a geometrical area using at least two coordinate attributes, wherein said geometrical area is divided into a grid having at least one section, defining a geographical zone by selecting within the grid the at least one section representative of a desired area and correlating at least one section into a pixilated computer image by associating at least one section to a pixel, loading said pixilated computer image into the transponder's memory, and programming a microprocessor in the transponder to transmit data to a control center upon receiving a command from the control center, the data being associated with the status of the entity in relation to the geographical zone.

In yet another aspect, there is a method to wirelessly control an entity having an attached transponder. The method comprises storing in a memory of a transponder data representative of a geographical zone, and measuring data utilizing a plurality of peripheral devices connected to the entity, the data being representative of the status of the entity in relation the geographical zone.

BRIEF DESCRIPTION OF THE DRAWINGS

By way of example, reference will now be made to the accompanying drawings.

FIG. 10B illustrates a screenshot of an instance of the history data processor.

DETAILED DESCRIPTION

Figure 1A:
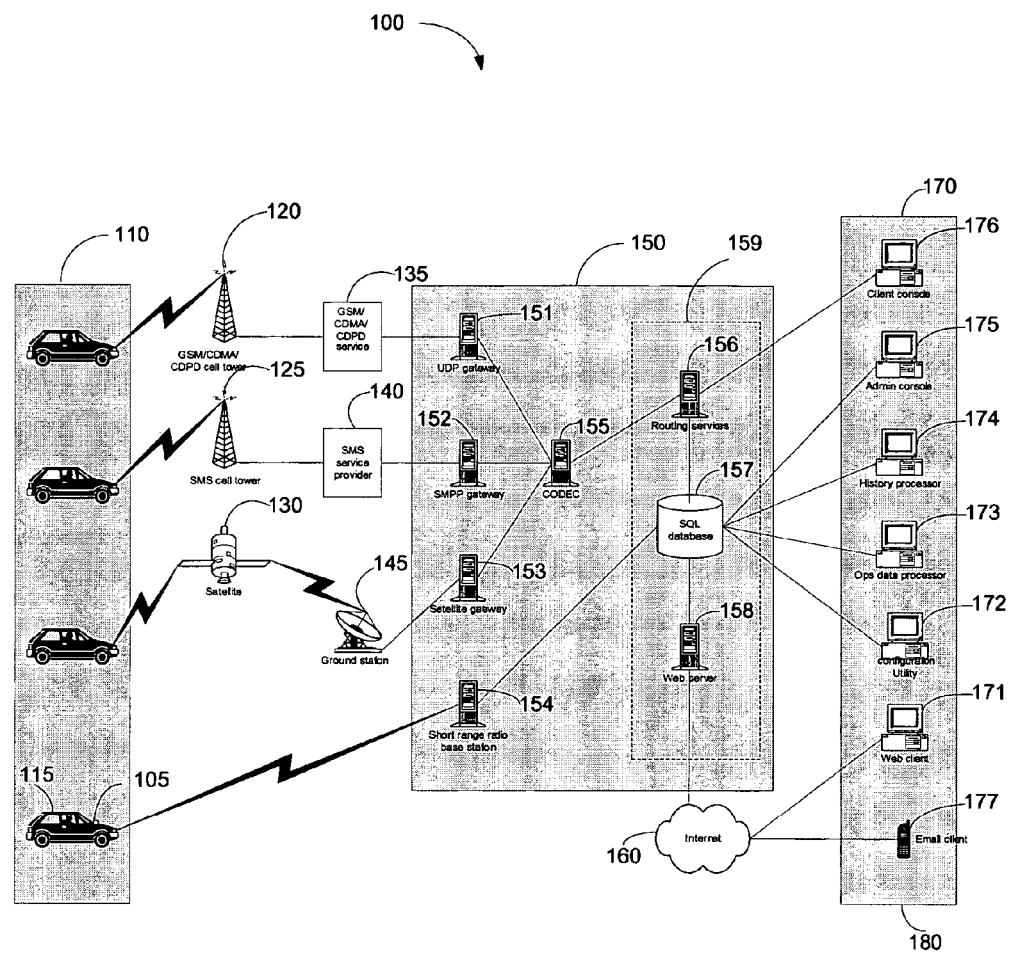
FIG. 1 illustrates the high-level architecture of a computer system for controlling and monitoring vehicles.

Asset management and monitoring devices that use ground positioning systems allow users to track the position of vehicles and cargo and other entities. The method and system described below utilizes a transponder that communicates over cellular and satellite communication networks in combination with GPS positioning satellites capable of providing position and status information on a global scale. The transponder allows interaction with and control of a wide range of peripheral devices, including operating according to preconfigured geographical zones and events.

A transponder can be mounted, attached, manufactured, or otherwise included upon/in various articles or entities. Such articles or entities may include vehicles, aircraft, cargo, persons, animals, or any other item where tracking its movement and/or location is beneficial. Within the context of the tracking system, the transponder works to collect, process, and communicate information about the article or entity to which the transponder is attached. Furthermore, when requested, the transponder can issue various commands and instructions to the local article or entity.

The transponder has the features, flexibility, and capability of an intelligent device. The transponder contains an at least 32-bit processor which can interface with at least one modem (cellular, satellite, and others), at least one Global Positioning System (GPS) receiver, at least one memory module, and other peripheral devices. Other components of the transponder may include, but are not limited is at least one GPS antenna, at least one modem antenna, at least one serial port for communication and configuration, at lest one multiple connector pin which contains at least one input and at least one output. These inputs and outputs are configurable to be associated with a configurable event or configurable operation.

The transponder can include many different combinations of the components listed above and similar components. For example, a transponder may have two modems wherein one modem is a satellite modem and one modem is a cellular modem. Additionally, a transponder could also contain a Bluetooth receiver in combination with the other components. The components of the transponder depend upon which capabilities the user requires.

Among its many capabilities, the central processing unit of the transponder can be configured to manage configurable events or configurable operations. Managing events means that among other capabilities, the transponder can report, observe, recognize, process, and analyze numerous configurable events or configurable operations, give and respond to various commands, effectuate numerous events in its local installation, and contain a history recording component.

The event message triggered by physical and logical events include the event message itself and such information includes latitude, longitude, speed, direction, time, state of all the inputs, state of all outputs, odometer, event reason or source, and any other relevant information concerning the entity.

The transponder is configurable to include as few or as many configurable logical events or physical events as the user desires. Events may be physical or logical. Logical events may be based on rules using a combination of the GPS position and one other factor such as time or speed. However, Logical events can be based upon a combination of factors. Physical events are those events which are physically manifested in the vehicle or object.

Configurable events or configurable operations refer to those actions that the CPU in the transponder will execute. Configurable events or configurable operations include, but are not limited to, the turning on or off of an ignition to a vehicle; the temperature level or change thereof; the fuel tank level or change thereof; the pressing of a button or level within a vehicle, wherein the button is associated with an emergency event; locking or unlocking of a door or latch, the opening or closing of a window, turning on or off of a LED signal light, the turning or off of various relays, the turning on or off of an alarm; the change of the power level of the battery; a bar code scanned by a connected scanner; passenger loading or unloading; cargo loading or unloading; vehicle part malfunction; vehicle diagnostics code received; impact detected; airbag deployed; seatbelts latched/unlatched; tire air pressure high/low; and other mechanisms in the vehicle or object.

Other configurable events or configurable operations include the location of the vehicle or object in terms of latitude, longitude, and/or altitude; the time and corresponding location of the last configurable event reported; the speed and direction of the vehicle or object, the state of any assigned inputs or outputs or change thereof; a pre-selected distance; a pre-selected time interval; pre-selected intervals based upon date and time reference; a pre-selected schedule for reporting and recording any of the configurable events or configurable operations; a pre-selected maximum speed; maximum acceleration; length of idle for a vehicle; length of non movement for an object.

Additional configurable events or configurable operations include the entering or exiting of a pre-set waypoint or a pre-set zone. A waypoint is a circular area defined by a geographical center point and radius. The area defined by the waypoint is configurable by changing the radius and the position of the geographical center point. A zone is an irregular region defined by a series of line segments enclosing an area.

The configurable events or configurable operations or combinations thereof can be processed in order to transmit a specific message, respond to a specific query or command, enable or disable a specific mechanism, or recognize a specific event. For example, the CPU can be configured to process that at if at a pre-selected time the vehicle or object has not moved a pre-selected distance, then the transponder is sent a command to turn off the ignition of the vehicle or otherwise alter the article.

The configurable events or configurable operations occur in many situations. These situations include, but are not limited to where configurable events or configurable operations occur in response to a command; where configurable events or configurable operations occur in response to a query, or where configurable or configurable operations events occur upon recognition of pre-selected conditions.

Configurable boundaries or geographical zones can also be used and are configurable to any shape the user desires. For example, the boundary or zone can trace the border of a state line or trace the route of a selected highway or path. The boundary or zone can trace the border of the premises of a school zone, a no-fly zone, a city, etc. The boundary or zone can also be a geometric shape or non-geometric shape. A further benefit of the present disclosure is that the transponder can be updated and configured locally or over-the-air.

FIG. 1A illustrates the high-level architecture of a computer system for controlling and monitoring vehicles. A plurality of vehicles 110 has at least one transponder 105 that can be tracked and allows the functionality to remotely control functionality of the vehicle 115.

The transponder 105 connects with a plurality and any combination of communication networks. In one embodiment, such communications network is a cellular network including multiple cellular base stations 120 and service providers 135. In another embodiment, such communications network is a cellular network including multiple cellular base stations with SMS receivers 125 and service providers 140. In another embodiment, such communications network is a satellite network including multiple satellite receivers and transmitters 130 and satellite ground stations 145. In yet another embodiment, such communications network is a short radio communications network.

The communications network permits the transponder 105 to communicate with a backend control system 150. The transponder 105 sends event information to backend control system 150 and responds to commands sent to the transponder 105 by the backend control system 150 through the communications network. The backend control system 150 includes a plurality of gateways 151, 152, 153 and 154 which interact with a codec 155. The codec 155 is the central codifier and decodifier of the backend control system 150 and allows the backend control system to adapt and communicate with any communications network. The modular design enables the introduction of new hardware and network protocols without having to change monitoring and reporting software. The backend control system 150 also includes an asynchronous routing system 159 that allows incoming and outgoing communications to be handled asynchronously and efficiently. In one embodiment, the asynchronous routing system 159 includes a plurality of routing services 156, at least one database 157 and a web server 158. The messages routed by the routing services 156 are directly communicated to a client console 176. The client console 176 presents vehicle 115 and transponder 105 information to the operator. The client console 176 sends to commands to the transponder 105 through the backend control system 150 and a communication network.

Multiple applications may connect to the central database 157 to provide further system functionality. An administrator console 175 permits operators to add, edit or delete transponder 105 information, vehicle 115 information, user information, etc. A history processor console 174 allows an operator to view reports and replay event data. An operations data processor 173 permits an operator to define geographical zones and waypoints for operation of the transponder 105. A configuration utility 172 permits operators to easily configure transponder 105 features and functionality.

Vehicle information can be presented to the operator through alternative mediums besides a client console 176. In one embodiment, vehicle information can be presented to an operator through a website or an email by transmitting such information from a web server 158 to a web client 171. In another embodiment, vehicle information can be presented to the operator by sending a text or voice messages to a predetermined wireless device 180.

Figure 1B:
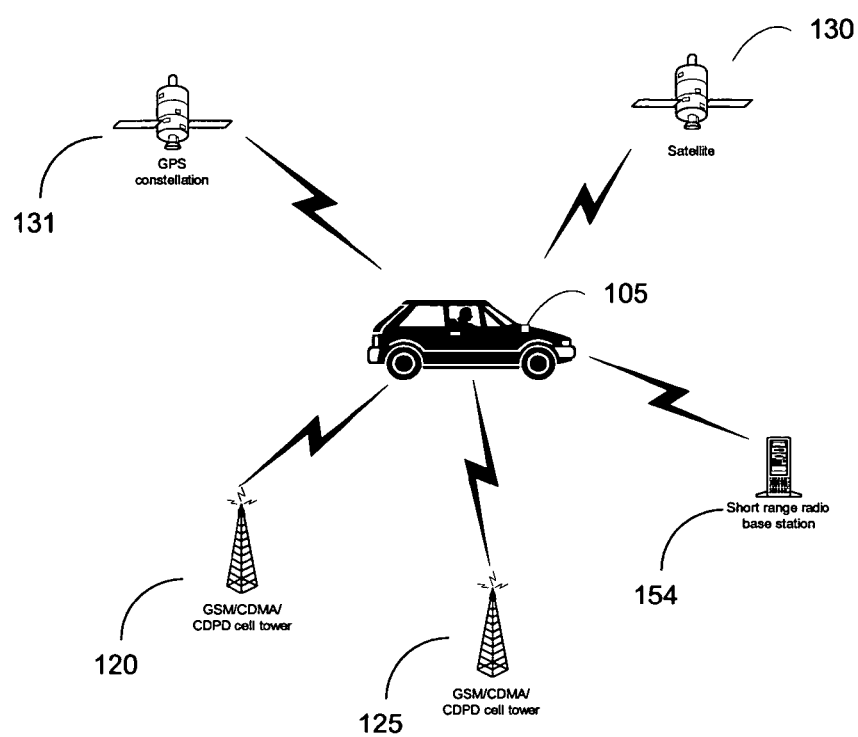

FIG. 1B illustrates the wireless connectivity of the transponder 105. The transponder 105 receives radio signals from a GPS constellation 131 allowing the transponder 105 to process positioning information. The transponder 105 can communicate wirelessly to various networks through multiple wireless devices integrated in the transponder's 105 hardware such as short range radio 154, a cellular receiver 120 and 125, and a satellite 130.

Transponder Hardware Configuration

Figure 2:
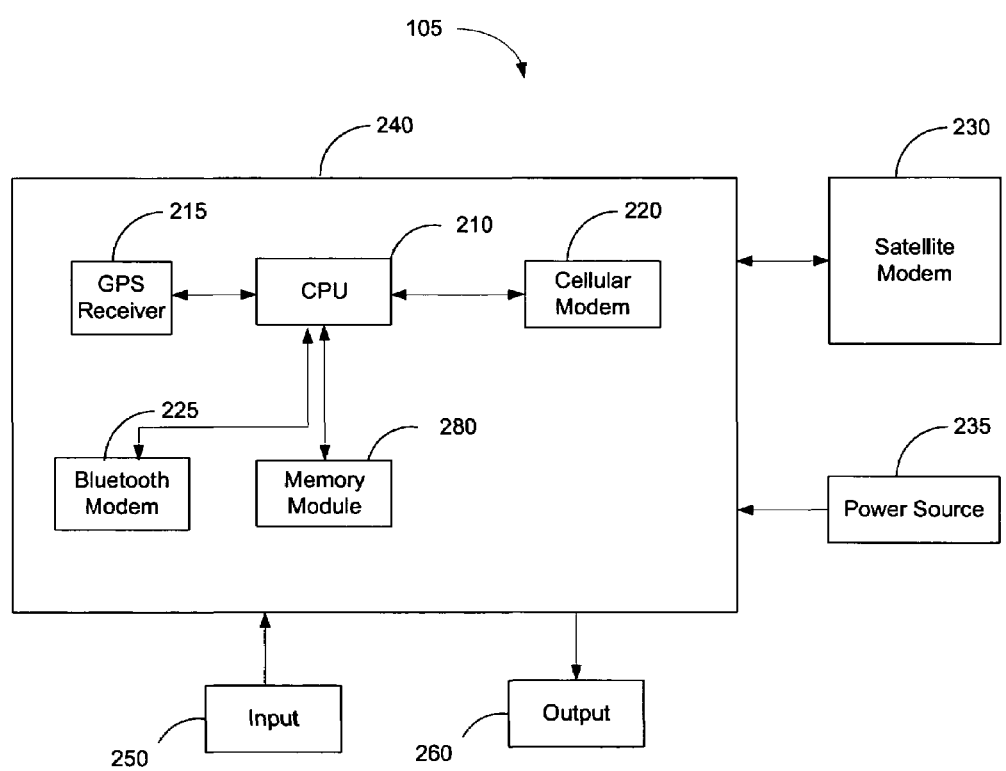
FIG. 2 illustrates a component layout of a transponder used in a system for controlling and monitoring vehicles.

FIG. 2 illustrates the internal board 240 of the transponder 105. The transponder board 240 contains at least one GPS receiver 215, at least one CPU 210, at least one cellular modem 220, and at least one memory module 280. At least one Bluetooth receiver can be included in the internal board 240. In one embodiment, the tracking system uses utilizes both cellular and satellite networks to provide the most affordable and complete global coverage.

The global positioning (GPS) receiver 215 is a capable of positioning accuracy to within a few feet or less. For example, a 12-Channel Trimble SQ, Lapaic UV40, or small-range accurate receivers are contemplated.

The processor 210 is at least a 32-bit processor. The processor 210 includes at least 32 Kilo-bytes of RAM. For example, a Motorola MMC2114 32-Bit RISC processor with two built-in UART's is contemplated. However, a similar or more advanced processor is also contemplated. The memory module 280 includes at least two additional memory chips, wherein each additional memory chip is at least 128K.

Figure 3A:
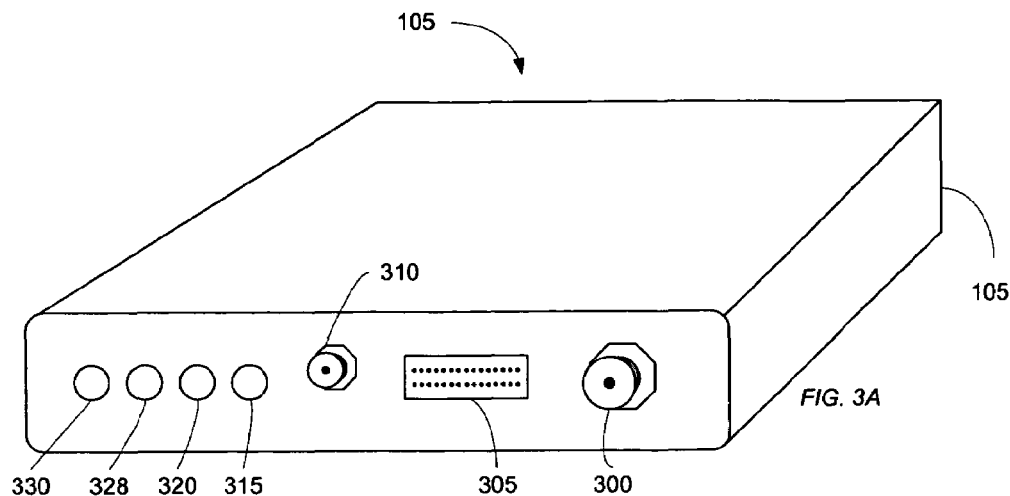
FIG. 3A illustrates a view of the front exterior of the transponder used in a system for controlling and monitoring vehicles.
Figure 3B:
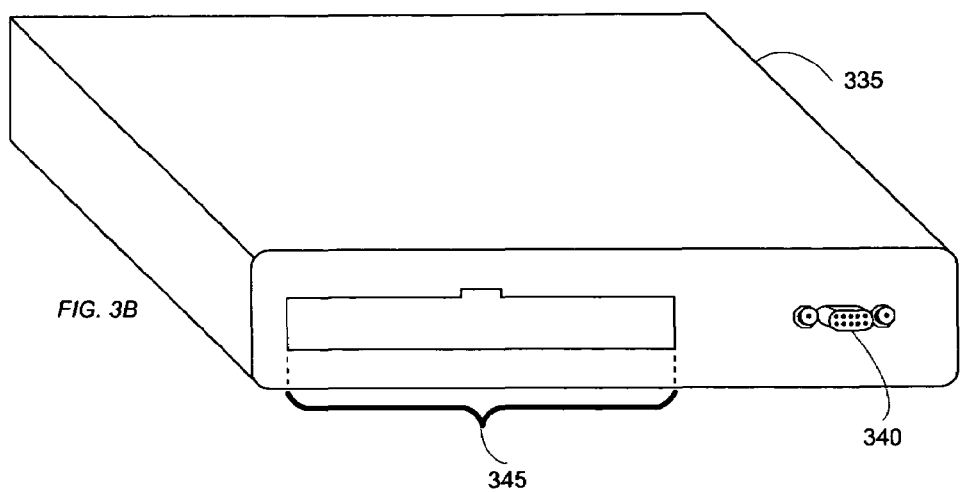
FIG. 3B illustrates a view of the back exterior of the transponder used in a system for controlling and monitoring vehicles.

In one embodiment, the cellular receiver or cellular modem 220 is the primary means for communication. The cellular modem 220 interfaces with at least one on board processor 110's built-in serial ports 345 or 340 as illustrated in FIG. 3B. The cellular modem 220 may be a GSM, CDMA or similar modem. The satellite modem or transceiver 230 is external to the transponder 105 and is connected by a serial port 340. In one embodiment, the satellite modem 230 is located under fiberglass or any other non-metal material in order to provide maximum coverage. The satellite modem 230 is primarily used only when there is little or no cellular coverage or when the user specifies use of the satellite modem 230. The efficient use of the satellite modem 230 functions to lower the cost of the tracking system to the user. One embodiment contemplates a satellite modem 230 such as a Sky Wave DMR-200 satellite modem. Similar contemplated satellite modems include features such as a built-in omni-directional antenna, provide worldwide coverage, and efficiently interfaces with the transponder's processor 210.

The Bluetooth receiver 215 has a range of at least 20 meters. For example, in one embodiment, a National Semiconductor Simply Blue LMX9820 Class 2 Bluetooth module is contemplated. However, similar or more advanced Bluetooth receivers are contemplated any other radio connectivity which does not require a line of sight. Preferably, the Bluetooth receiver 215 is installed to utilize different capabilities such as integrating and supporting multiple wireless peripherals, acting as a short-range radio to download data, or to serve as a local, traveling wireless "hotspot."

In one embodiment, the power source 135, is a fused main power-in source with a recommended operating voltage range between 12 and 24 volts. One embodiment contemplates low power consumption (65 mA or less) during normal operation. Furthermore, the transponder 105 includes a circuitry for charging an optional backup battery. If the primary power source 135 supply reaches a minimum acceptable voltage, the transponder 105 will automatically switch to backup power as well transmit a message identifying that the power source 135 is a critical level.

Figure 3C:
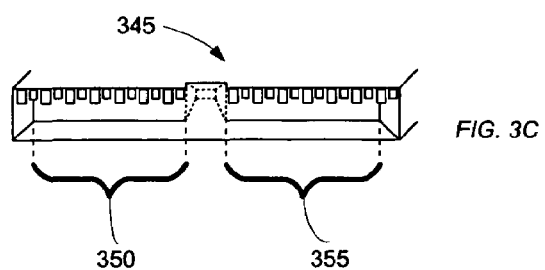
FIG. 3C illustrates a multiple pin connector included on the transponder.

The transponder 105 is a small and affordable unit with numerous features. The external view of the transponder is illustrated in FIGS. 3A and 3B. In one embodiment, the housing 335 of the transponder 105 is metal or made from a material that functions to protect the inner components from external events such as physical damage, dust, water, excessive temperatures or any other event which could affect the integrity of the transponder. As illustrated in FIGS. 3A, 3B, and 3C, the transponder 105 contains at least two external communication ports 305 and 340, a multiple pin connector 345 with at least nine sensor inputs 350, at least four control outputs 355, a modem antenna connector 300, several indicators 315, 320, 325, 330, and a GPS antenna connector 310. In another embodiment, a Bluetooth antenna (not depicted) is an optional feature.

The multiple pin connection 345 of one embodiment contains 20 pins. The number of pins within the transponder 105 is variable ranging from zero to as many pins as appropriate for its intended use.

At least nine of the pins function as inputs 345. The inputs 345 function to gather information concerning the status of the article in which the transponder 105 is mounted upon. Each input can be assigned to a corresponding specific configurable event or operation. The input signal may be analog or digital. In one embodiment, each input 345 is optically isolated and protected against over-voltage/under-voltage current surges. Furthermore, each input 345 can be individually enabled or disabled either locally via a serial cable or over the air. Additionally, each input 345 is configurable over the air and locally. These inputs 345 are configurable to the specific desires and uses of the user. These capabilities are later discussed in further detail.

In one embodiment, at least one input 345 is a digital input dedicated to the ignition circuit path of a vehicle. If the input 345 is enabled, a message is transmitted when the vehicle is turned on. A second message is transmitted when the vehicle is turned off. Analog inputs are also useful in functioning with ranges. For example, an analog input can function with temperature and fuel tank levels. In one embodiment, the remaining inputs function to monitor different features of the vehicle.

Other inputs 345 may include a panic input which may be connected to an emergency button installed discreetly inside the vehicle. If the panic input is enabled and the emergency button is pressed for pre-selected, configurable amount of time, a message is transmitted relating the panic event. Similar inputs may include a medical assistance input, roadside assistance input or any other inputs which the operator may use for immediately communicating an event. These messages can be continually transmitted for a determined period of time until the message is acknowledged by the proper party or monitoring entity.

At least four of the pins in the pin connector 345 function as outputs 355. The outputs 355 function to control mechanisms or enact functions upon the article or vehicle where the transponder 105 is mounted. Each output 355 is fused and capable of providing at least 0.5 amps per channel. However, if more than one output 355 channel is utilized the sum total of all used output channels should not exceed one amp. Each output 355 can be set high or low utilizing an over-the-air command. In one embodiment, the outputs 355 control various apparatus and objects within the vehicle itself. For example purposes only, the outputs can control the door locks, the vehicle windows, a LED signal light, the fuel tanks or valves, various relays, and other mechanisms in the vehicle. The LED signal light can function as an acknowledgement tool. For example, in the case of medical, roadside, or safety assistance is needed, the occupier or passenger of the vehicle can press a button to alert the client console 176. When the operator or appropriate entity receives and acknowledges the event, a command is sent back to the transponder 105 that will turn on an intermittent light for a determined amount of time so that the occupier or passenger is assured the message was received and assistance is on the way. In other embodiments, such as a cargo, the outputs 355 can control various features of the cargo such as a locking mechanism, a signal light, or temperature control.

The serial ports 305 and 340 in FIGS. 3A and 3B illustrate at least one 9-pin serial port 340 for the purpose of interacting with, and controlling peripheral devices and at least one 4-pin serial interface 305 consisting of data in/out and two flow control lines. The external serial port 340 can support various peripheral devices such as a MDT (mobile data terminal), satellite modem, bar code scanner, short-range radio, or PDA. For example, the external serial port 340 can support a passenger counter which interfaces several door infrared motion sensors for the purpose of the counting the number of people entering or exiting from the one to four doors. The serial port 305 can also be used to test and configure applications within the transponder 105. In one embodiment, the port 305 functions as a programming port which is used when programming the unit for the first time or re-programming the unit's core program.

The indicators 370 in FIG. 3A can be associated with any type of connection, signal, power level, status, and any other similar communications. In one embodiment and in FIG. 3A, indicator 330 is a LED that appears red when the transponder has power connected to it. Indicator 325 is a LED which blinks green at a rapid pace when the GPS receiver is establishing a connection and slowly blinks green when a connection is established. Indicator 320 is a LED light which blinks green for every message received and red for every message sent. Finally, indicator 315 is a LED which is red when the cellular modem is roaming and is green when it is at home.

Transponder Firmwear Configuration

The transponder 105 has numerous features, functions, and capabilities described below. The transponder 105 is an intelligent device controlled by an at least 32-bit processor 110. FIG. 2 depicts one embodiment where the processor 105 has the capability to interface with a GPS receiver 310, a cellular modem 200, a Bluetooth radio 220, a memory module 180, and a satellite modem 130.

The transponder 105 can be configured to report, observe, and analyze numerous logical events. The transponder is also configurable to give and respond to various commands, and contains a configurable history-recording component. A further benefit of the present disclosure is that all the configurations to the transponder 105 can be done locally or over-the-air. Thus, the user is able to configure any features including the entire operating system of the transponder over the air. This over-the-air configuration can be accomplished through use of the cellular modem 200, the Bluetooth radio 220, or any other wireless means.

Moreover, the transponder 105 can be configured locally through connecting to a serial port 305 or 340. Another benefit of the present disclosure is that during over-the-air or local configuration, the transponder 105 continues to operate normally. This means the transponder 105 can be configured with losing little to no operability. Over-the-air configuration commands change the parameters used for processing physical and logical events on the fly. Over-the-air operating system updates are achieved using two executable code spaces, and a temporary code space for loading new code. Once the uploading of new code into the temporary code space is completed, the transponder reboots, copies the new code into the secondary executable code space and resumes execution with the most recent update.

FIGS. 4A-4G are exemplary screen shots of the user interface for configuring the physical and logical events within the transponder in one embodiment. FIGS. 4A-4G serve only as examples of a general interface which the user can interact with to configure the transponder 105. One important feature of the present disclosure is that configuring the transponder does not require the user to know scripts or hard-coded parameters. Instead, the present disclosure includes a software application which the user can easily interface with logical windows, tabs, fields, checkboxes and radio buttons to configure the transponder.

Figure 4A:
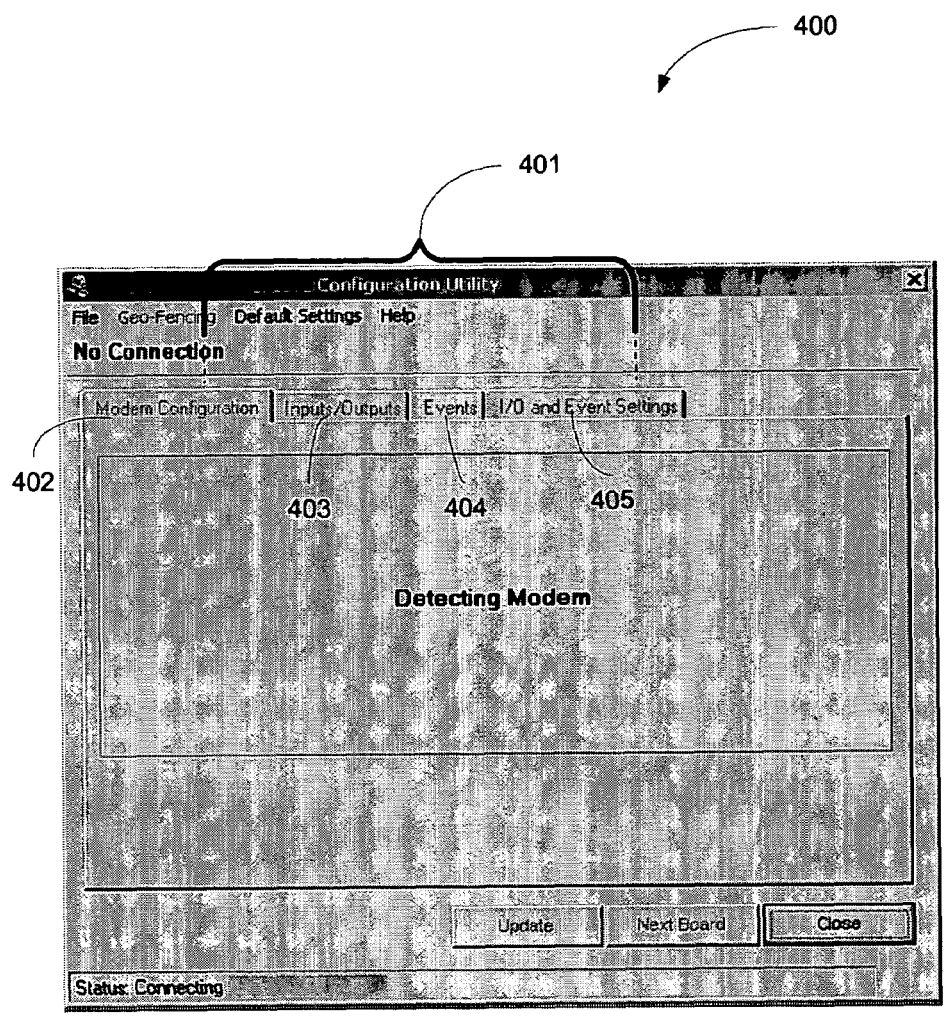
FIG. 4A illustrates a window of the transponder configuration application where the modem is being detected.
Figure 4B:
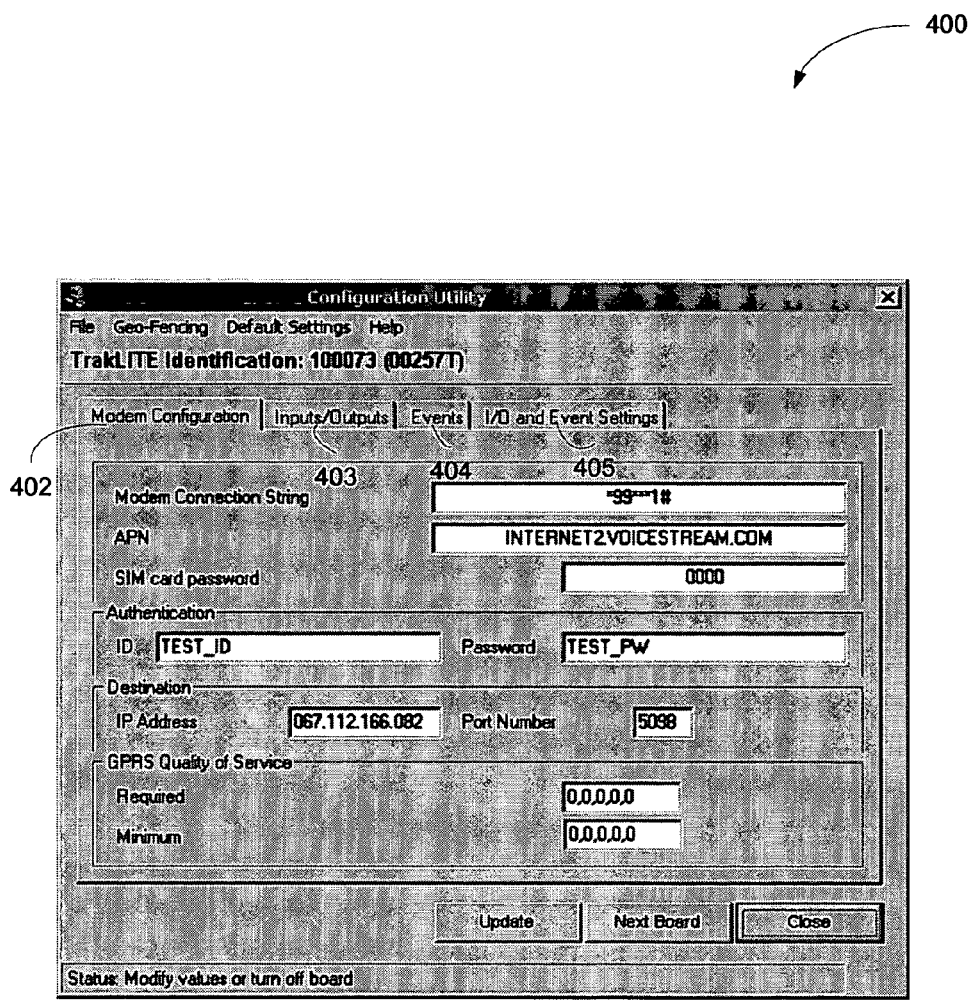
FIG. 4B illustrates a window of the transponder configuration application where the user may select parameters to configure the modem.

FIG. 4A is a screen shot of a window that interfaces with the user to configure the transponder 105. The window 400 has at least four tabs 401 from which the user can choose. The first tab 402 directs the user to a window 400 for configuring the modem of the transponder 105.

Figure 4C:
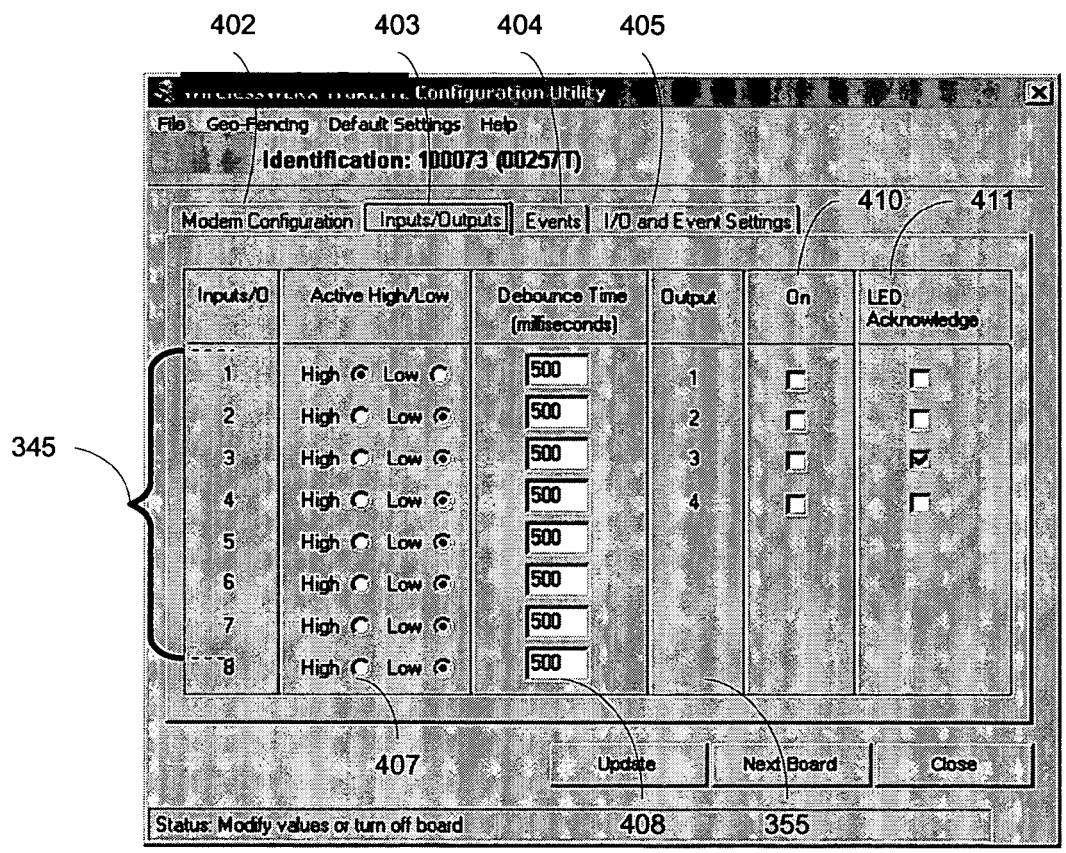
FIG. 4C illustrates a window of the transponder configuration application where the user may select parameters to configure multiple inputs and outputs.

The second tab 403 directs the user to a window 400 where the user can configure at least 8 Inputs 345 and at least 4 outputs 355. FIG. 4C depicts the interface when the second tab 403 is selected. The activity level 407 of the inputs 345 can be configured to be either high or low. The outputs 355 can be configured to default to an active or inactive state at startup using the "On" field box 410. The outputs 355 can be further configured to be associated with a LED acknowledgment 411. The outputs 355 can be assigned to any type of control mechanism or function within the vehicle or article where the transponder 105 is mounted. For example, the outputs 355 can be assigned with a door locking mechanism in a vehicle. In this example, if Output 1 355 in FIG. 4C is associated with a door locking mechanism, the user could check the "On" 410 field box. When the transponder first boots, the door locks connected to output 1 would automatically lock, and would remain locked until unlocked by an over-the-air command. When an output is selected as an LED acknowledge, that output will change to an active state during an acknowledgeable priority event, and blink to off when that priority event is acknowledged by the Response Center.

Figure 4D:
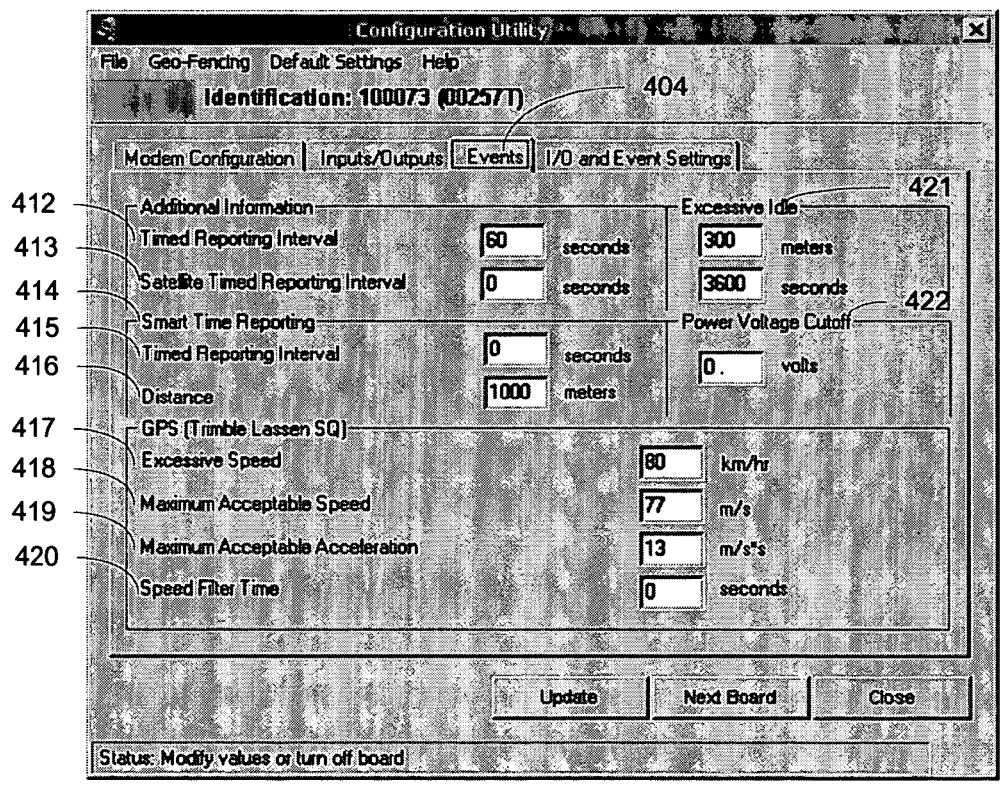
FIG. 4D illustrates a window of the transponder configuration application where the user may select parameters to configure multiple logical and physical events.

The third tab 404 directs the user to a window 400 where the user can configure certain logical events. FIG. 4D depicts the interface when the third tab 404 is selected. The logical events 412-420 in FIG. 4D are exemplary only. Moreover, the present disclosure contemplates a variety of configurable logical events not depicted in FIG. 4D. The logical events 412-420 selected in FIG. 4D are individually discussed below. Each event has a corresponding field box in which the user can fill in the appropriate value.

Figure 4E:
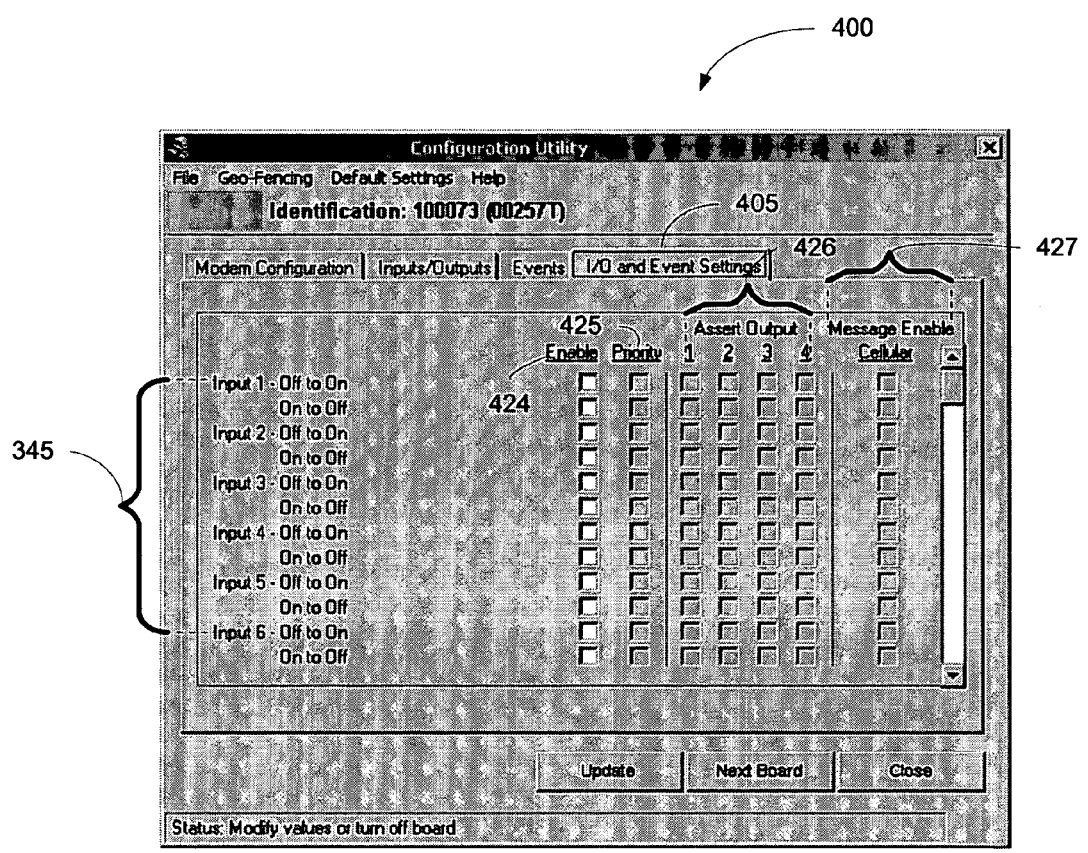
FIG. 4E illustrates a window of the transponder configuration application where the user may select parameters to configure multiple inputs and features.
Figure 4F:
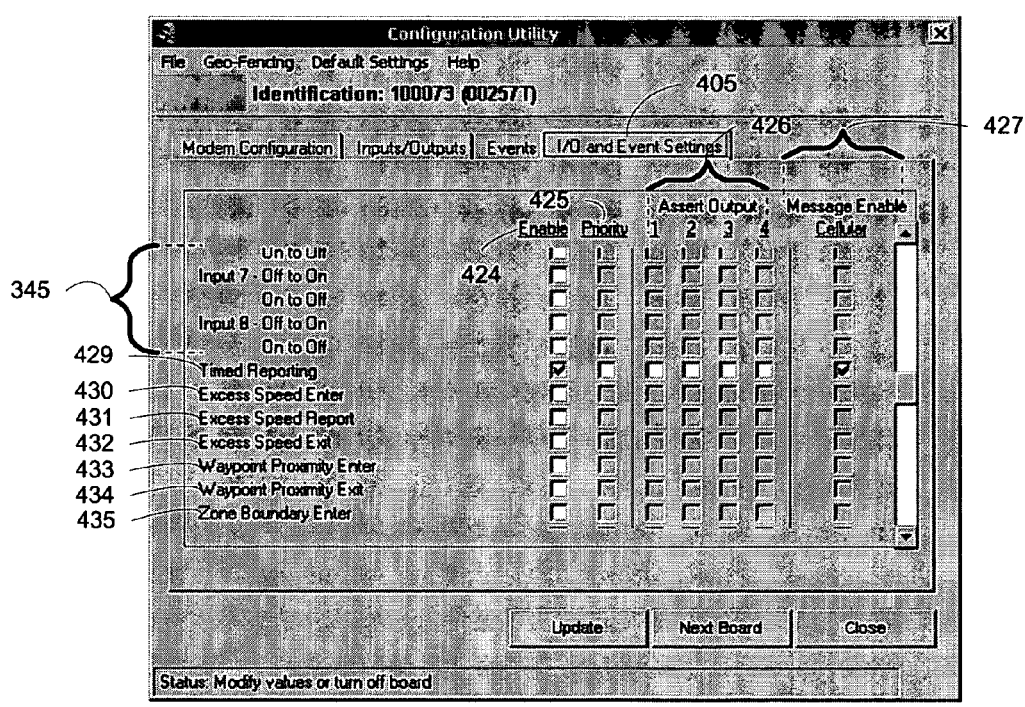
FIG. 4F illustrates a window of the transponder configuration application where the user may select parameters to configure multiple inputs and features.
Figure 4G:
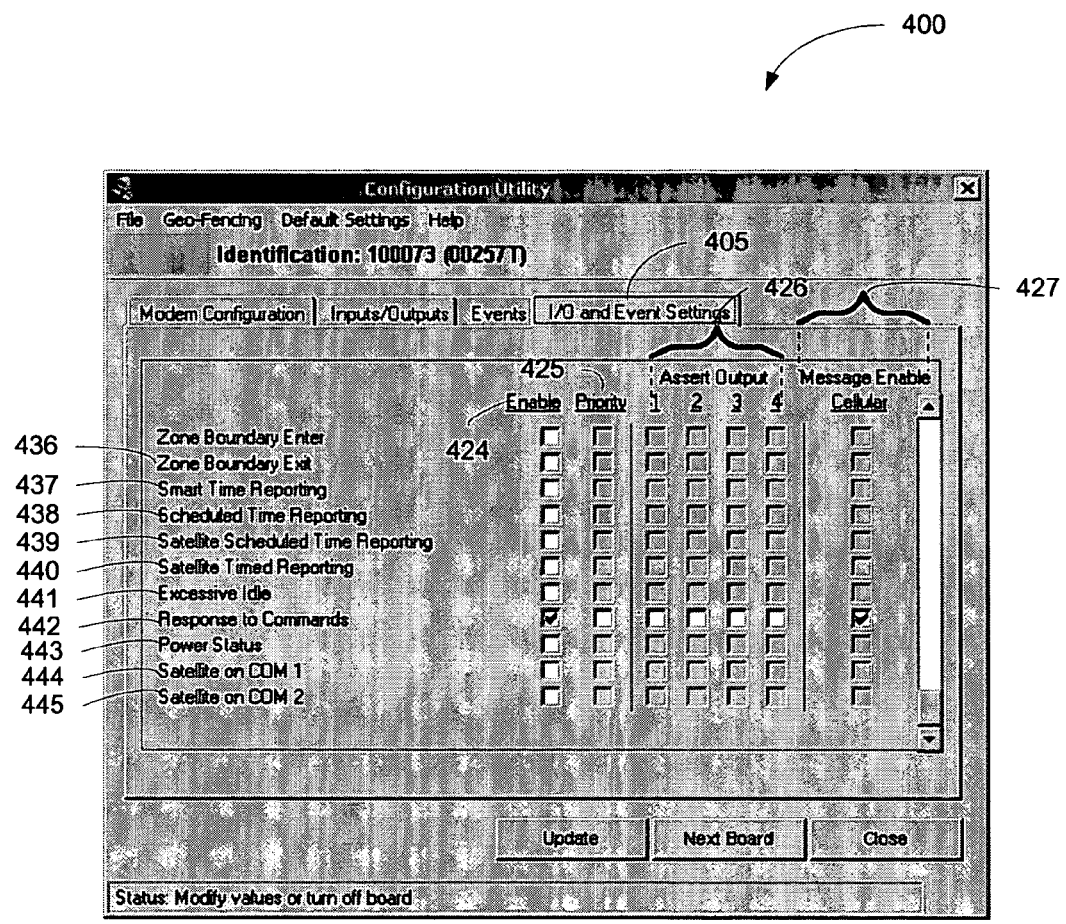
FIG. 4G illustrates a window of the transponder configuration application where the user may select parameters to configure multiple inputs and features.

The fourth tab 405 directs the user to a window 400 where the user can configure the inputs 345 and specific features of the transponder 105. FIGS. 4E, 4F, and 4G depict the interface when the third tab 404 is selected. As stated above, each input can be assigned a corresponding event. For example, an input 345 can be assigned to the ignition of a vehicle. Thus, occurrences associated with the ignition of the vehicle are communicated and displaced as a specific Input 345. The user has the ability to configure each input 345 and each feature 429-445 by enabling the input or feature 424, assigning the events as a priority event 425, assigning one or more outputs 426 to the events, or link the occurrence of the events to a messaging sent via the cellular network 427.

Events can be physical or logical. Physical and logical events trigger the sending of a message over the air when certain conditions are met. Most logical events are based on rules using a combination of the GPS position and one other factor such as time or speed. The event message triggered by physical and logical events includes the event message itself and such information includes latitude, longitude, speed, direction, time, state of all the inputs 345, odometer, event reason or source, and any other relevant information. The logical events are usually software driven, calculation based, and typically draw from GPS positions. The transponder 105 is configurable to include as few or as many logical events as the user desires. One embodiment includes at least six different configurable logical events.

The first logical event of one embodiment is a feature that reports the last known location of the transponder for a specified interval of time. This time reporting 412 features is depicted in FIG. 4D. The status report to the user may consist of other parameters such as latitude, longitude, speed, direction, time and the state of the inputs 345. For example, FIG. 4D shows an example where the user configured the time reporting 412 interval for 60 seconds. This means that in this scenario, the last known location status and applicable parameters are reported every 60 seconds. This time reporting feature 412 gives the user flexibility and the option to lower the cost of data transmission. FIG. 4D also depicts an entry for Satellite Timed Reporting Interval 413, where the same time reporting feature is applicable, only the message is transmitted via an optional satellite modem. Again, due to the typically higher costs of satellite communication, the user has the flexibility to determine how often he or she wishes to incur the cost of satellite reporting on a fixed time period.

The second logical event of one embodiment is a feature that further refines the reporting capabilities of the time reporting feature 412. This event is depicted as Smart Time Reporting 414 on FIG. 4D. The Smart Time Reporting 414 feature functions to transmit a report only when the vehicle has moved a pre-selected distance since the last transmitted report. FIG. 4D shows that the Smart Time Reporting 414 feature is configurable in terms of a time interval 415 and distance 416. Thus, a user could configure the transponder 105 to report its location and applicable parameters by selecting a timed reporting interval 415 in terms of seconds and a distance 416 in terms of meters. For example, a user could select the time reporting interval 415 for 60 seconds and the distance 416 for 1000 meters. This would mean that every 60 seconds the transponder would send a report unless the transponder 105 has not moved at least 1000 meters since the last report. This smart time reporting 414 feature allows the user to tailor the amount of reporting and the cost of data transmission.

Another contemplated reporting feature, not depicted, is a scheduled reporting features. This feature sets the transponder's reporting feature on an interval based upon a date and time reference. Thus, the user can configure the transponder to report location and the other parameters on pre-selected days and hours of the week. For example, a user could use the scheduled reporting feature to configure the transponder to only report at 8 am, 12 pm and 4 pm on weekdays and only once per weekend day. Also not depicted is satellite scheduled reporting where the same scheduled reporting capabilities are applicable, only the message is transmitted via an optional satellite modem A third logical event of the one embodiment is a speeding feature. The transponder 105 can be configured to send reports dependent on the speed of the vehicle or article the transponder 105 is mounted to. FIG. 4D shows that the user can configure the transponder 105 for at least 2 different settings concerning speed. Specifically, the user can select the excessive speed 417 and a speed filter time 420. The excessive speed 417 is configurable for the user to select a maximum speed threshold for the vehicle or article. Thus, each time the speed threshold is exceeded, events are generated, recording when the threshold was exceed, the maximum speed reached when above the threshold and when the unit crossed below the threshold. When the transponder 105 crosses back below the threshold, the event message indicating this occurrence as well as a third message indicating the maximum speed reached during the period when the transponder 105 was above the speed threshold is transmitted. The speed time filter 420 gives the user the option to set a time period in terms of seconds to allow the vehicle or article to cross the speed threshold without sending a message. This filter also acts to make data transmission efficient. For example, the user can set the speed time filter 420 for 15 seconds which allows the vehicle to speed for 15 seconds without sending a report. This scenario is beneficial for instances when the vehicle is speeding to pass another vehicle or accelerating to merge into traffic. Similar to the other logical events, the event message also includes information such as the latitude, longitude, speed, direction, time, and state of the inputs.

A fourth logical event of one embodiment is an excessive idle feature 421. The transponder 105 can be configured to send reports dependent on the amount of time the vehicle or article has been idle. FIG. 4G shows that the user can configure the excessive idle 421 feature to be enabled 422, considered a priority event 425, assigned an output 426, or linked to a messaging system for cellular phones 427. The excessive idle 421 feature generates an event message whenever the maximum excessive idle time is reached. The event message records the time and location corresponding to when the threshold was exceeded. This feature is helpful to users who wish to monitor or reduce the number of vehicles which have the ignition turned on (using gasoline), but are not moving.

Geofencing

The next logical event of one embodiment is a "geofencing" or creating configurable boundaries or geographical zones feature. This feature consists of generating events when the transponder travels through waypoints and zones. A configurable boundary or geographical zone may be constructed through a combination of waypoints and/or zones. Because of this combination, the configurable boundary or geographical zone can be constructed in a very specific shape and outline specific borders or routes. A waypoint is a circular area defined by a geographical center point and radius. The area defined by the waypoint is configurable by changing the radius and the position of the geographical center point. Thus, the boundary created by the waypoints and zones is configurable.

In one embodiment, the transponder 105 is loaded with a plurality of waypoints, each waypoint defined by a coordinate and a radius. A zone can be defined by a plurality of waypoints. Thus, for example, a city can be defined by two waypoints. Using GPS data, the transponder will calculate whether it is in any of the two waypoints defining the city. If the transponder determines that it is inside one of the two waypoints, then the transponder 105 assumes that it is within the limits of the city.

A zone is an irregular region defined by a series of line segments enclosing an area. In one embodiment, each zone contains 3 to 256 or more deflection points for creating the line segments defining this irregular area. In one embodiment, this irregular area can create a configurable boundary or a geographical zone. The properties of a zone include a name, description and a flag determining if the zone is an off-limits zone or an enclosed zone.

In one embodiment, a geographical zone may be created selecting a plurality of coordinates and downloading the coordinates to the transponder 105. The plurality of coordinates may be in the Mercator system. Next, the transponder 105 assigns each coordinate to a pixel in a pixilated image that is loaded in the transponder 105. In order to perform the assignment, the transponder 105 utilizes logic to define a "bounding" square or box around the plurality of coordinates. Then the bounding box is pixilated and the pixels where the coordinates falls are marked as activated. Once the pixels for each coordinate are assigned, lines are extended from one pixel to the next so as to form an enclosed area in the pixilated image. The pixels the lie in the path of the lines between the activated pixels are also activated. Thus an enclosed and contiguous line of pixels is formed.

Waypoints and zones are built by the operations data processor 173. Once a waypoint has been built, it can be used in transponder loads. Transponder loads are a collection of zones and waypoints slated to be loaded on a transponder 105. These loads are loaded on to the transponders with the configuration utility 172.

FIG. 4F illustrates a screenshot of the configuration utility 172 for configuring waypoint and zone events. The configuration utility 172 allows the operator to configure the Waypoint Proximity enter feature 433, the Waypoint exit feature 434, the Zone Boundary enter feature 435, and the Zone Boundary Exit feature 436. The Waypoint Proximity enter feature 433 monitors when a waypoint has been entered, the Waypoint exit feature 434 monitors when a waypoint has been exited, the Zone Boundary enter feature 435 monitors when a zone has been entered, and the Zone Boundary Exit feature 436 monitors when a zone has been exited. FIGS. 4F and 4G show the user interface of one embodiment where the user may enable the waypoint and zone features, assign the events as a priority event 425, assign an output 426 to the events, or link the occurrence of the events to a messaging system for cellular phones 427.

Figure 5A:
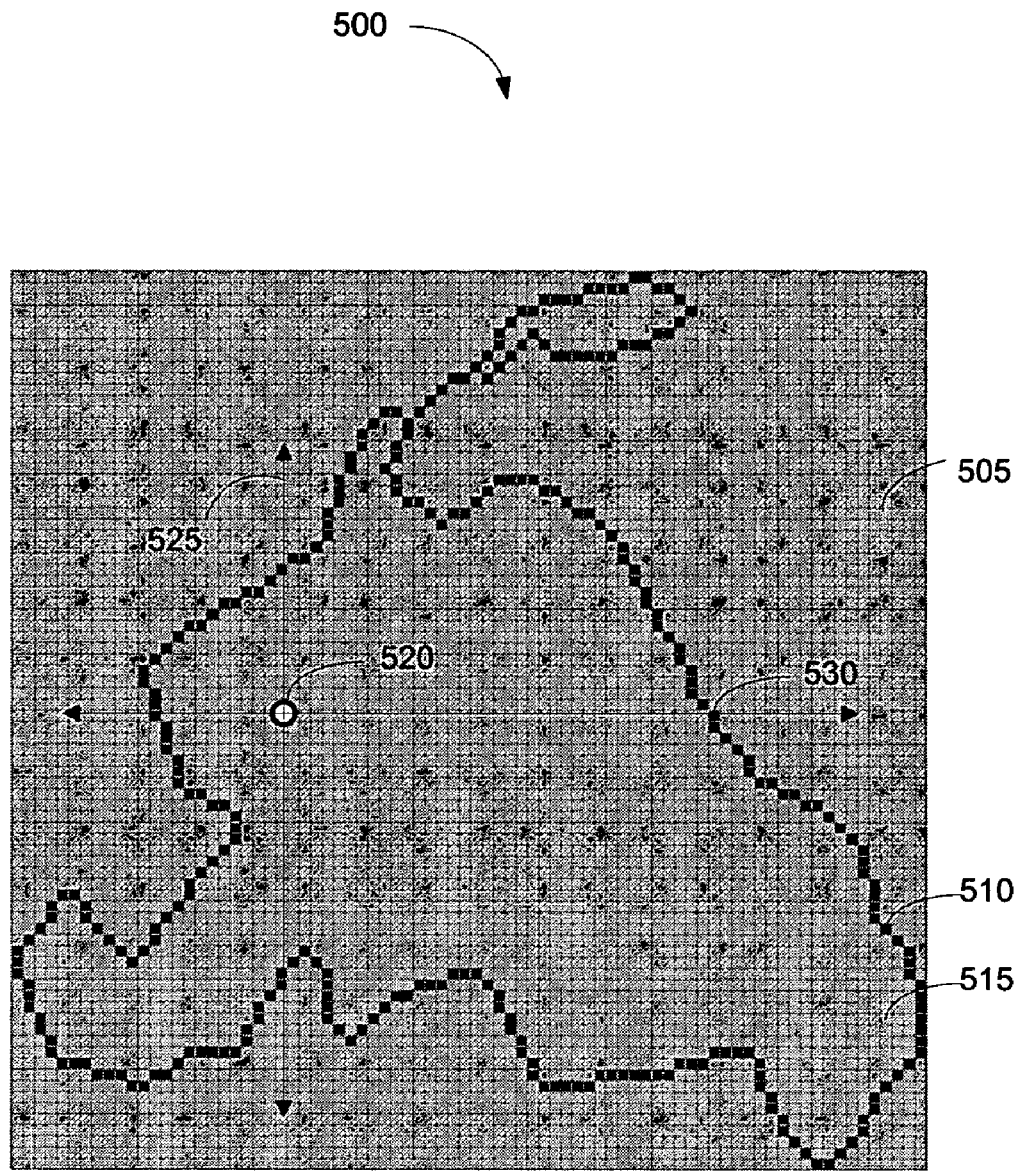
FIG. 5A illustrates a pixel map of a zone.

FIG. 5A illustrates a pixel map 500 of a zone. After all the deflection points for a given zone are uploaded, the zone is saved in the memory module 280 of the transponder 105 in the form of a pixel map 500. The pixel map 500 is created by first drawing a square around the entire area of the zone. The square is then divided into an 80/80-pixel map. Each pixel 505 is a square. These squares are then used to draw the outline shape 510 of the zone 515. A geographical area is then mapped to each pixel 505 of the pixel map 500. A position fix 520 in the pixel map 500 is mapped from the current geographical location of the vehicle.

A test is performed to for each zone for each position fix 520 in order to determine if the transponder 105 is inside the zone 515 or outside the zone 515. Thus, for each zone 515, the test starts with a simple check if the position fix 520 is inside or outside the pixel map 500. If the current position fix 520 is inside the pixel map 500, a more extensive test is completed by plotting the position fix 520 inside the bounding box and drawing four lines in four directions (north, south, east and west) from the position fix 520 to the borders of the pixel map 500. Subsequently, the number of zone boundary crossings 530 is counted for each of the four lines 525.

Multiple boundary crossing tests are performed for accuracy. If a given line 525 crosses an odd number of zone boundaries 510, the position fix 520 is considered inside the zone 515. If a given line 525 crosses an even number of zone boundaries, the position fix 520 is considered outside the zone 515. If at least three out of the four boundary crossing tests agree, the zone boundary crossings 530 are used to determine if the position fix 520 is inside or outside the zone. If three out of the four boundary tests do not agree, the position fix 520 is considered outside the zone 515.

Position fixes 520 that are on the special locations in the pixel map 500 can yield specific location results. In one embodiment, position fixes 520 that land on a zone boundary 510 are determined to be outside the zone boundary 510. In another embodiment, position fixes 520 that land on a zone boundary 510 are determined to be inside the zone boundary 510. In one embodiment, position fixes 520 that land on a "long and narrow protrusion" which is only one pixel wide can be considered to always be inside the zone 515. In another embodiment, position fixes 520 that land on a "long and narrow protrusion" which is only one pixel wide can be considered to always be outside the zone 515.

After all the deflection points for a given zone are uploaded, the zone is saved in the memory module 280 of the transponder 105 in the form of a pixel map 500. The pixel map 500 is created by first drawing a square around the entire area of the zone. The square is then divided into an 80/80-pixel map. Each pixel 505 is a square. These squares are then used to draw the outline shape 510 of the zone 515. A geographical area is then mapped to each pixel 505 of the pixel map 500. A position fix 520 in the pixel map 500 is mapped from the current geographical location of the vehicle.

Figure 5B:
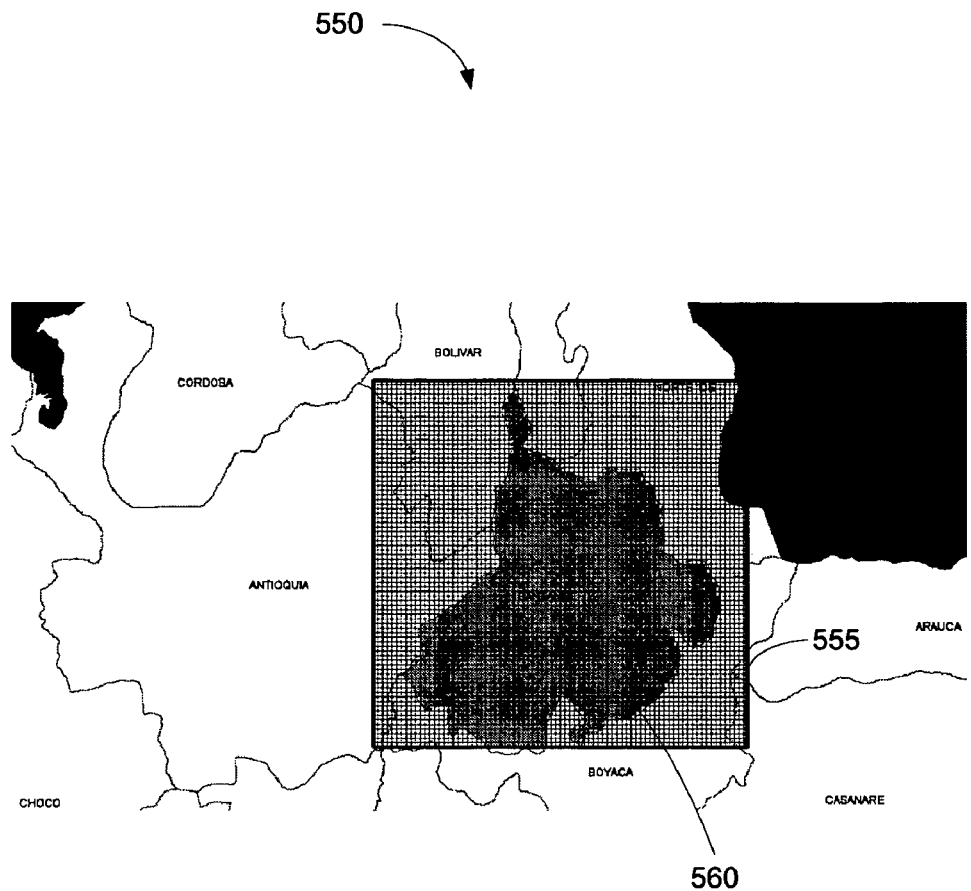
FIG. 5B illustrates a pixel map of a geographical zone.

FIG. 5B illustrates a pixel map 550 of a geographical zone. The pixel map 550 is first presented to the user as a geographical map on a screen connected to a computing device. In one embodiment, the user then selects a rectangular shape 555 around the geographical area 560 that the user desires to define. In another embodiment, the user may define a customized shape. The rectangular shape is then divided into smaller rectangles such that the area of the rectangle is divided into a grid. Each pixel in the grid can be activated to be part of the geographical zone. In one embodiment, the user may activate each pixel by double-clicking on each pixel. In another embodiment, the user may select a smaller rectangular region and mark the smaller rectangular region as being part of the geographical zone 560 so that the pixels contained in the smaller geographical zone are activated. In yet another embodiment, the user may select a circular area as being part of the geographical zone 560, and all pixels in such circular area would be activated. In another embodiment, the user may define any customized geometrical or non-geometrical shape.

Once all the desired pixels are selected by the user as being part of the geographical zone 560, the rectangular shape 555 is mapped into a pixilated computer image. In one embodiment, the pixilated computer image contains the same number of pixels as the number of sections in the grid. The pixilated computer image can then be loaded to the transponder 105. The transponder 105 can be programmed to determine the position of the entity with a simple calculation of whether the pixel in which the transponder's location falls is activated or deactivated. In another embodiment, the geographical zone is defined by selecting a rectangular region and a circular region. The circular region can be defined by a waypoint.

An irregular zone or geographical zone may be defined by a collection of waypoints and pixilated images. Furthermore, each irregular zone may have additional parameters such as speed threshold of the entity, flagged as a "no-fly zone," color coded in order of danger or security threat, communication enabled or disabled, etc.

When the transponder 105 enters or exits waypoints and zones, an event message is transmitted indicating what reference point or zone has been entered or exited. The event message can include latitude, longitude, speed, direction, time, state of the inputs, odometer, event reason or source, and any other relevant information. Thus, the zone boundaries and waypoints allow the user to track a vehicle or an article through configurable boundaries or geographical zones such as state borders or a specified route.

In one embodiment, the waypoint and zone events are configurable to one or more assigned outputs. Meaning, when the transponder 105 enters or exits waypoints and zones it can initiate an output. An output can consist of a LED light unit within the vehicle or article, a door locking mechanism, a fuel valve mechanism and so forth. This means that the user can configure the vehicle to lock its doors or close a fuel valve if the vehicle enters or exits a specific waypoint or zone.

Commands

The transponder 105 is also configurable to respond to various query and set commands sent over the air. The position query commands the transponder 105 to return the last valid GPS position, speed, direction, time, input state, and other relevant information. The transponder can also be configured to respond to an odometer query. Upon receiving this query command, the transponder 105 returns the last valid GPS position, speed, direction, time, input state, running odometer value, and other relevant information.

The transponder 105 is also configurable to respond to various query commands sent over the optional satellite modem. The satellite position query commands the transponder 105 to return the last valid GPS position, speed, and time. The transponder 105 can also be configured to respond to a satellite odometer query. Upon receiving this query command, the transponder 105 returns the state of its inputs and running odometer value. Examples of other forms of query commands that are sent to the transponder 105 are Input and Output Signal Query, Analog to Digital Levels Query, Passenger Count Query, Firmware Version Query, Satellite Status Query, Satellite Position and Velocity Query, Satellite Odometer and IO Query, etc.

Another optional command is the alarm acknowledgement. This command is sent to the transponder 105 to terminate the sending of a priority event (panic, medical or roadside assistance are examples of priority events). When the alarm acknowledgement is received, no further priority messages for the current event are transmitted.

In one embodiment, the command is setting a single output. This is used to change the state of an output to either active or inactive over-the-air. An example would be to unlock the back door of an armored truck when it arrives at the bank or turn on the fuel pumps for a tanker truck when it arrives at a gas station.

In another embodiment, the command may be to send a text message, from the transponder 105 through the communication network to a device configured to receive and interpret text messages.

In another embodiment, the command is a configuration command to configure functionalities of the transponder 105 as previously discussed. Examples of configuration commands include Configure Timed Reporting, Set Odometer, Upload New Firmware, Configure Excess Speed Event, Configure Excessive Idle Event, Configure Satellite Timed Reporting, Configure Power Level Critical, Configure Satellite Communication Port, Enable Event, Configure Priority Events, Enable Cellular Message, Enable Short-Range Radio Message, Assert Output Event, Configure GPS Filter, Enable Input, Set Passenger Count, Configure Smart Timed Reporting, Configure Scheduled Reporting, Configure Satellite Scheduled Reporting.

The transponder 105 also may include a history reporting component. Whenever the transponder 105 cannot transmit data packets due to a lack of coverage via the principle communication mediums, the packers are stored in one of at least two history logs on on-board flash memory storage device. When the transponder determines that the communication link has been re-established, any packets stored in memory are sequentially transmitted, beginning with those messages identified as a priority. For example, emergency or roadside assistance would be a priority message which would be the first message transmitted when the connection is re-established.

In an effort to combat GPS drift, two parameters are included to filter GPS positions received from the GPS receiver. The two filters are based upon maximum allowed speed and maximum allowed acceleration. The parameters can be customized to the type of installation. If a packet is received from the GPS receiver and either of these two parameters is exceeded, the position packet is thrown out.

Backend Control System

Figure 6:
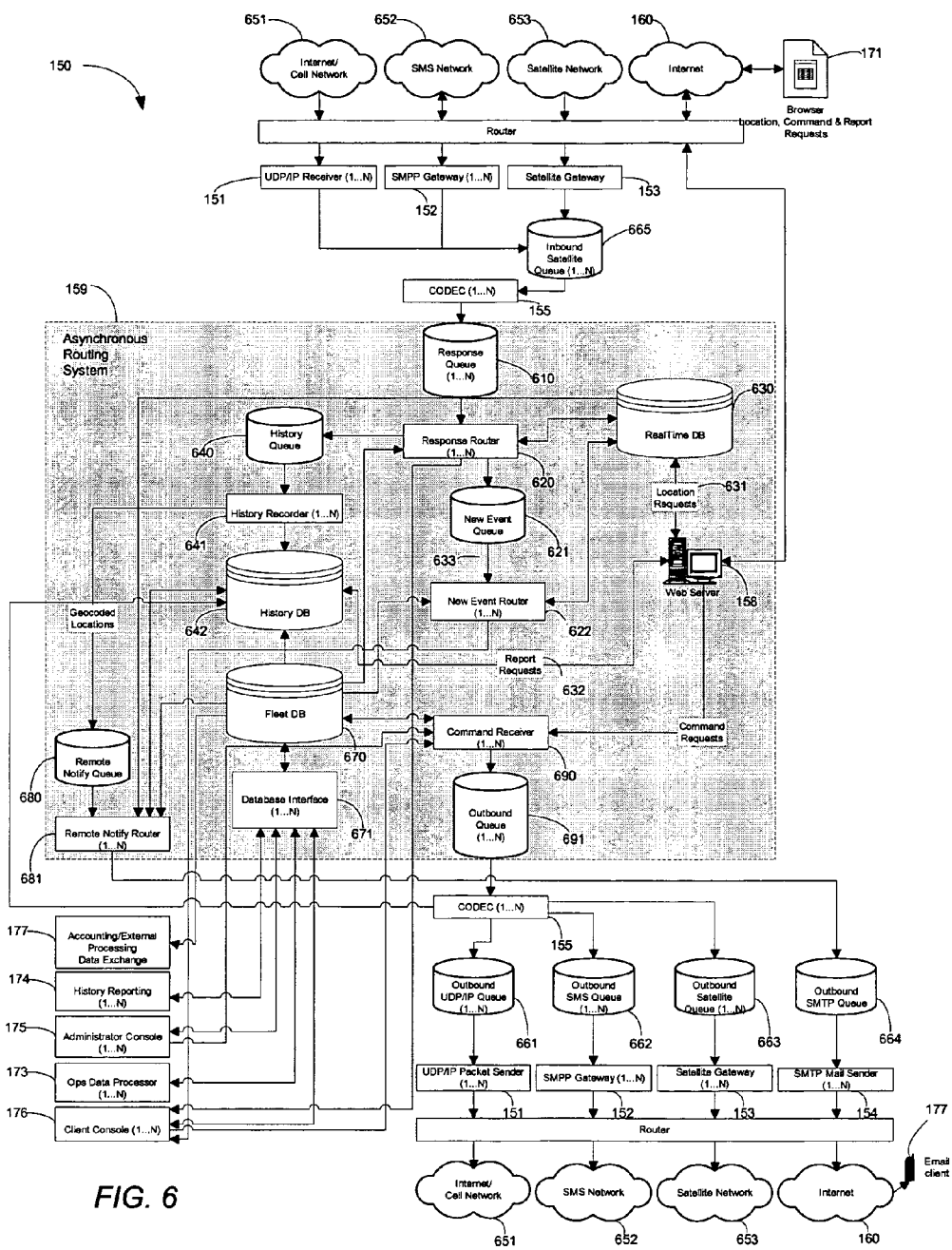
FIG. 6 illustrates a component diagram of a backend control system.

FIG. 6 illustrates a backend control system 150. The backend control system 150 includes a plurality of gateway systems 151-153, a codec 155, and an asynchronous routing system 159. In turn, the asynchronous routing system 159, includes a web server 156, a plurality of router systems 620, 622, a real time database 630, a history database 642, and a fleet database 670.

The real time database 630 maintains records of the most recent information form a transponder such as location, speed, direction, odometer reading, etc. The history database 642 maintains records of all events and transactions that were received and sent from the asynchronous routing system 159. Finally, the fleet database 670 keeps records of all the administrative entities such as the controlled mobile and static objects to which a transponder is attached to (e.g. a vehicle), users, transponder configuration, fleets, etc.

The backend control system 150 can be configured to run on any combination of computer servers. In one embodiment, the plurality of communication gateway systems 151-153 runs on independent computer systems. In another embodiment, the communication gateways 151-153 run on a common computer system.

The communications gateway systems 151-153 direct data flow from each of the transponders 105 into the backend control system 150. The gateway systems 151-153 also direct commands and queries to the appropriate transponder 105. Each gateway establishes and maintains a communication link with a communications network 651-653. In one embodiment, the gateway is a Universal Datagram Protocol/Internet Protocol (UDP/IP) packet receiver and sender 151 which connects to an internet/cellular network 651. There may be more than one UDP/IP gateway 151 transmitting and receiving data. The UDP/IP gateway 151 allows the backend control system 150 to communicate with transponders 105 over GSM/GPRS, CDMA/1×RTT and CDPD networks using UDP packets.

In another embodiment, the gateway system is a Short Message Peer to Peer (SMPP) gateway 152 that connects with a Short Message Service (SMS) network 652. A plurality of SMPP gateway systems 152 transmit and receive data for transponders that communicate over SMS networks using an SMPP protocol. Each SMPP gateway system 152 opens and maintains a continuous connection to the service provider's Short Message Service Center (SMSC) for incoming data so that reception of transponder 105 data from the SMSC can be guaranteed.

In another embodiment, the gateway system is a satellite gateway 153 that connects to a satellite network 653. As illustrated in FIG. 1A, the satellite network 653 may include one or more satellites 130 and, at least on ground station 145. The satellite gateway 153 transmits and receives data for transponders 105 that communicate through satellite communication. In one embodiment, the satellite communication protocol may be that of Inmarsat satellites using eight-byte packets of data. The satellite gateway 153 gateway opens and maintains a continuous connection to the satellite network 653.

The communication between the asynchronous routing system and transponders are channeled through an appropriate gateway system 151-154. An appropriate gateway system 151-154 is selected based on a unique combination of transponder manufacturer, communications protocol and service provider. For example, a transponder 105 that uses CDPD communication would be routed through a different gateway system 151-154 than a transponder 105 that uses SMS communications protocol. Likewise, transponders 105 that use the same communication protocol such as CDPD, but have a different service provider would have separate gateways.

As the gateway system 151-153 receives each inbound packet of data, the gateway system 151-153 tags each packet with the date and time of arrival, the transponder 105 manufacturer information, the transponder's 105 address information, and repackages the packet for transmission to the codec 155. The gateway 151-153 then writes the repackaged data into a queue 665 that is read by a codec 155.

When the gateway system 151-153 receives an outbound packet from an outbound queue 661-664, the gateway system 151-153 uses the address information to send the packet to the target transponder 105. If required, the gateway system 151-153 verifies before transmission that the gateway system 151-153 has an open and valid connection to the corresponding network 651-653. Each gateway system 151-153 has at least one corresponding outbound queue 661-663. For example, each UDP/IP gateway 151 has at least one outbound UDP/IP queue 661. Each SMPP gateway 152 has at least on outbound SMS queue 662. Each satellite gateway 153 has at least one outbound satellite 663. Each SMTP mail gateway 154 has at least one outbound SMTP queue 664.

After a packet is placed in the inbound queue 665 the data coming from various networks is decoded into a standard data format. Likewise, before a packet is placed in an outbound queue 661-664, the data going to different communications networks is coded from the standard data format, into a network specific format. The coding and decoding of data is carried out by the codec (coder-decoder) 155. The codec 155 permits the greater flexibility because the introduction of new communication network protocols is transparent to the asynchronous routing system 159. Thus, if a new transponder model uses a new communication network protocol, the backend control system does not need to be upgraded. The system upgrades needed would be a codec 155 update and a new gateway if necessary.

When a packet comes into the asynchronous routing system 159, each inbound packet that the codec 155 receives is first examined to determine the transponder model. If the codec 155 supports the specified transponder model, the data is translated from the transponder 105 proprietary format into the standard system format. Once the codec 155 has interpreted the data, the codec 155 then writes the data into a response queue 610. If the codec 155 does not recognize the transponder model, the codec 155 then logs the unsupported data and emails the data to a designated system or network technician.

When a packet is sent from the asynchronous routing system 159 the codec 155 determines the transponder model to which the packet is sent. If the codec 155 supports the specified transponder model, the data is translated from the standard system format into the transponder 105 proprietary format. Likewise, if the packet is sent to another device that is not a transponder 105, the codec determines if it supports that device, and if so, translates to the appropriate format. Once the codec 155 has interpreted and encoded the data, the codec 155 then places the packet into the queue that corresponds to the appropriate type of network communication protocol. An SMS packet data would be placed into the outbound SMS queue 662. If the codec 155 does not support the transponder model, the codec 155 then logs the unsupported data and emails the data to a designated system or network technician.

Once a packet is processed by the codec 155, it then gets processed depending if it is an outbound or inbound packet. Outbound packets are placed in the appropriate outbound queue 661-664. Inbound packets are received by the asynchronous routing system 159 in a response queue 610. The response queue 610 feeds the packets to the response router 620. The response router 620 determines if a client console 176 is tracking the transponder 105 associated with the incoming message. If so, the response router 620 routes the incoming message to the appropriate client console 176. Thus, the client console receives the message before any other process in the asynchronous routing system 159. If no client console 176 is tracking the transponder 105 associated with the incoming message, the response router 620 places the incoming message into a new event queue 621. The new event queue 620 feeds a new event router 622. The new event router 622 analyzes each incoming message and determines if the incoming message is associated to a new priority event for the transponder 105. The new event router 622 determines if the incoming message is associated to a new event by searching a real time database 630 for a similar event associated to the transponder 105. If no event is recorded for the transponder 105, or the event is of high priority, the new event router 622 sends a routing request to all client consoles 176 that have permission to view the incoming message. The request is intermittently sent until at least one client console 176 accepts the routing request. Once the routing request is accepted, the client console 176 adds the transponder 105 to an inventory in the client console 176 so that the incoming message can be handled.

Asynchronously, a history queue 640 receives the inbound and outbound messages for all transponders 105. The inbound messages are fed from the history queue 640 to the history recorder 641. The history recorder 641 geocodes all packets that have a valid latitude and longitude. The geocoded information is saved in a history database 641 to be used later for reporting and statistical analysis.

Incoming messages from transponders 105 may also be forwarded to an email address, or cellular telephone, or any other communications device. To achieve this functionality, the history recorder 641 also transmits the geocoded locations to remote notify routers 681 by placing the geocoded locations in a remote notify queue 680. The remote notify router 681 that receives the geocoded location and event information queries the fleet database 670 to find out if the configuration information associated with the transponder 105 requires a notification to a communications device 177. If a notification is required, the remote notify router 681 retrieves the contact information for the appropriate communications device 177. The remote notify router 681 then formats and encodes the message sent to the communications device 177. The message is placed in the outbound SMTP queue 664 to be sent through the SMTP gateway 154. The message can be placed in the outbound SMS queue 662 to be sent through the SMPP gateway 152.

The real time database 630 is also updated with the new event information associated with the incoming message. Thus, the real time database 630 contains the latest information reported on a given transponder 105. The real time database 630 is connected to a web server 158. The web server 158 is directly connected to the internet 160 and allows users of a web tracking application 171 to make location requests, command requests 632 and report requests 633. When a web server 158 receives a location request 631 from the web tracking application 171, the web server 158 queries the history database 642. The history database 642 contains all events in a chronological order. The web server 158 retrieves all transactions related to the web tracking application 171 query and forwards the data to the web tracking application 171 for displaying in a web browser.

When a web server 158 receives a location request 631 from the web tracking application 171, the web server 158 queries the real time database 630 for the corresponding transponder 105 information. The real time database 630 provides transponder information as related to the very last incoming message from the incumbent transponder 105. The web tracking application 171 may also send a command request 632 such as querying the position of the transponder. The command request 632 is sent to the command receiver 690 which in turn process the position request command by tagging the appropriate transponder 105 information. The message is encoded by the codec 155, placed in the appropriate outbound queue 661-663 and sent through the corresponding gateway system 151-154 to the transponder 105. The transponder 105 will then send back a response, and the backend control system 150 then processes it updating the real time database 630. After the real time database 630 has been updated, the web server 631 may refresh the contents of the web tracking application 171 showing the new position of the transponder 105.

The command receiver 690 processes all commands pertaining to all outbound messages to be sent to transponders. The command receiver may receive command messages from the client consoles 176, the administrator consoles 175, or from the web server 158. When the command receiver 690 receives a command message, the command receiver 690 tags each outbound message with the correct transponder 105 address by searching a fleet database 670 and retrieving the address information. Each message is sent by the command receiver 690 to the codec 155 for encoding.

All of the commands that are processed by the command receiver 690 are ultimately sent remotely to the transponder 105. In one embodiment, the command is a Position Query. Upon receiving this query command, the transponder 105 returns the last valid position, speed, direction, time and input state. In another embodiment, the command is an Odometer Query. Upon receiving this query command, the mobile products return the last valid GPS position, speed, direction, time, input state, and running odometer value. In another embodiment, the command is an Input/Output Query. Upon receiving this query command, the transponder returns the last updated state of all inputs and all outputs (active/inactive). For any given input, the active state is relative to that the configuration of that input. For instance, if an input is configured to be active-low (H-L), then 0 volts at the input translates into that input being "active." If the input is configured to be active high (L-H), then 12/24 volts at the input translates into that input being "active." In another embodiment, the command is a Time Report Set and/or Home IP. This command is sent to the transponders to configure the reporting interval for the Timed Reporting feature of the firmware. This command can also be used for setting the transponder's destination IP/MIN address. This command allows the transponders can be reconfigured over-the-air to transmit to a new control center or home address if the IP/MIN address of the control center or home address changed. In another embodiment, the command is Set All Outputs. This command is sent to the transponder to set all outputs simultaneously. Any individual output can be either high or low. In another embodiment, the command is Set Single Output. This command is sent to the mobile products to set one individual output either high or low. In another embodiment, the command is Enable/Disable Inputs and Events. This command is sent to the transponders to enable/disable all known transponder features. Both physical and logical events can be individually enabled and/or disabled. While the physical and logical events can be disabled, the ability to query the transponder for its location and status can remain enabled. In another embodiment, the command is an Alarm Acknowledgment. This command can be sent to the transponder to terminate the sending of an emergency event such as panic, roadside assistance, or medical assistance. When the alarm acknowledgement is received, no further emergency messages for the current event are transmitted from the transponder 105.

The asynchronous routing system 159 interacts with various control consoles. Reporting consoles 174 connect to the fleet database 670 to display fleet information. Administrator consoles 175 also connect to the fleet database to retrieve transponder, vehicle, and user information. Administrator consoles 175 also connect to the command receiver 691 to send commands to the transponder 105. Operations data processors 173 connect to the fleet database 670 in order to retrieve configuration information for a specific user or transponder 105. Finally, the client console 176 receives information for a tracked transponder 105 from the response router 620, receives information for a non-tracked transponder from a new even router 621, and retrieves information from the fleet database 670. The client console also transmits command to a transponder 105 by sending the command to the command receiver 691.

Management Software

Figure 7A:
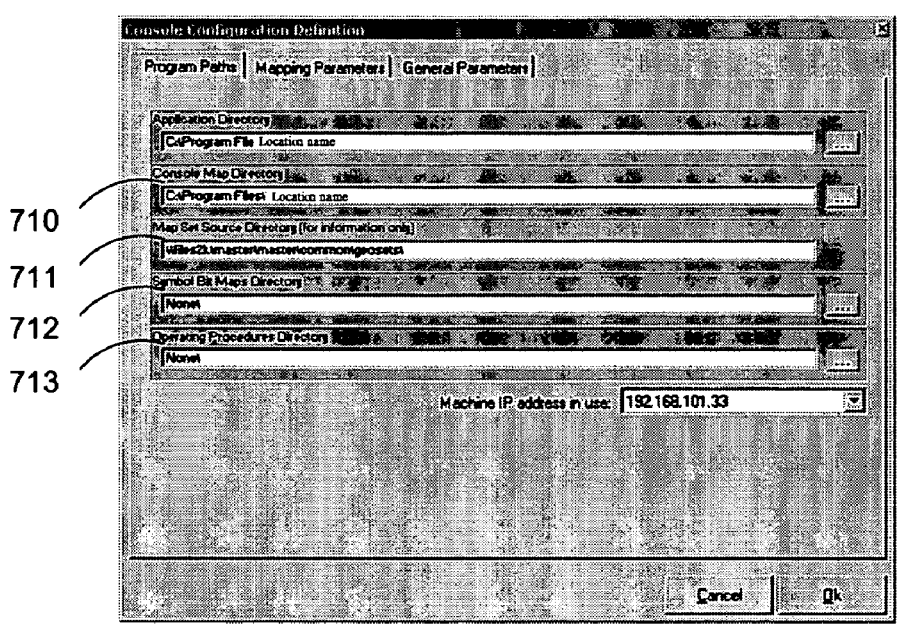
FIG. 7A illustrates a screenshot of an instance of a client console.

FIG. 7A illustrates a screenshot of an instance of the client console 176. The client console 176 provides real-time transponder 105 location mapping, location tracking, transponder control and transponder message/event handling.

Figure 7B:
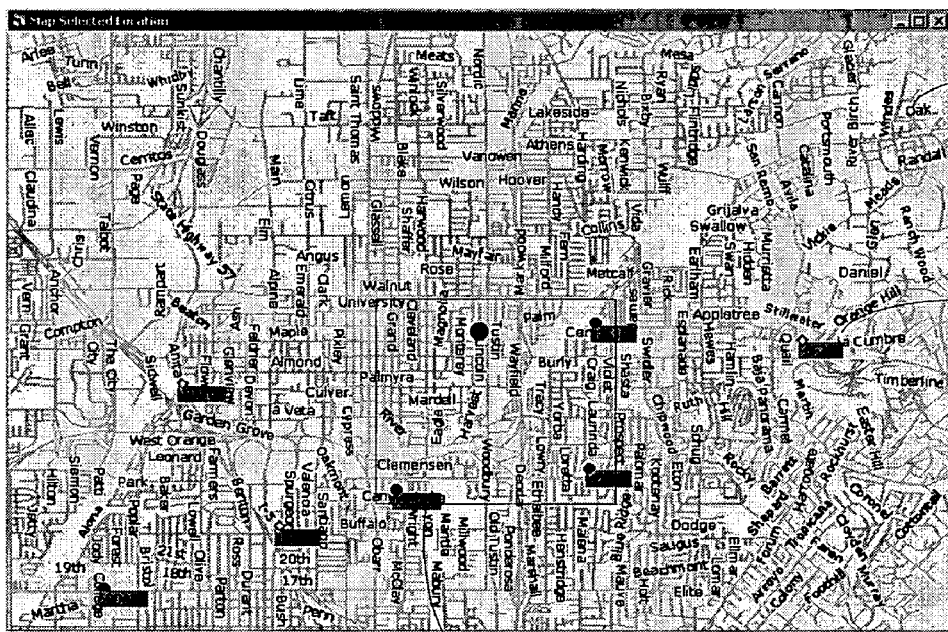
FIG. 7B illustrates a screenshot of an instance of a client console.

In one embodiment, the client console 176 connects to map databases and transponder databases by configuring multiple parameters. Such parameter can include path definition for the console map sets 710, any custom data sets 711, map information display symbols 712 and console operating procedures 713. The Settings are maintained in the system registry and recalled at program load. In another embodiment, the client console 176 provides the ability to configure mapping parameters used by the client console 176. The client console 176 also provides with the ability to define the console location, default zoom levels when displaying the various program-generated maps, the map set to be used and whether or not street locations are displayed when mapping a location. FIG. 7B illustrates a screenshot of an instance of the client console 176. A graphical user interface allows maps to be displayed on the client console 176. In one embodiment, the client console 176 displays all available transponders on one master map. In another embodiment, the client console 176 allows a user to view transponders by groups 721 or individually 720. In another embodiment, the client console allows a user to view all transponders that come within an area 722 displayed by the map. In another embodiment, the client console 176 allows a user to view all transponders that are within a waypoint. In another embodiment, the client console 176 allows a user to view all transponders that are within a zone.

The client console 176 allows a user to employ a variety of mapping tools to help manage transponder 105 location processing. Provided tools include map zoom in/out, map pan, map feature label, map ruler, map location at selected point, map legend, center map on selected point, find a map feature and center map on it, display information for a selected custom dataset element, display information for a selected transponder, display information for a standard map feature and print the displayed map.

Further, the displayed map uses color-coding for both location symbol and location identification to indicate special conditions relating to the transponder 105. Special situations that are color-coded include transponder moving, transponder stopped, transponder not reporting, transponder location is old and transponder has a priority message active.

Figure 7C:
FIG. 7C illustrates a screenshot of an instance of a client console.
Figure 7C:
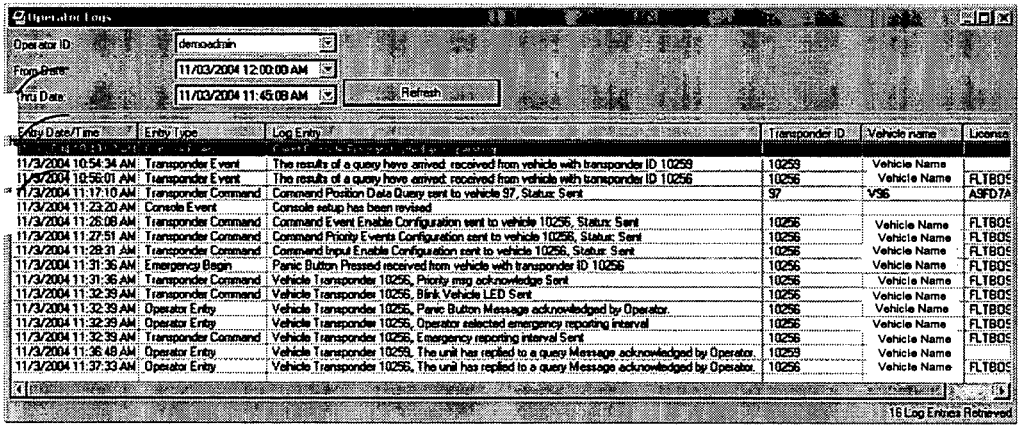

As illustrated by FIG. 7C, the client console 176 can generate a user-operating log that includes all messages received by the console 740, commands sent by the console 741 and key events 742 that occur during console operation. In another embodiment, the generated log is interactive such that a user can append a free form remark to the event log and to recall and view the event log for any selectable time period. In another embodiment, the client console 176 provides the ability to generate a summary list of the assigned transponder inventory and the current real-time status of a selected transponder.

Figure 7D:
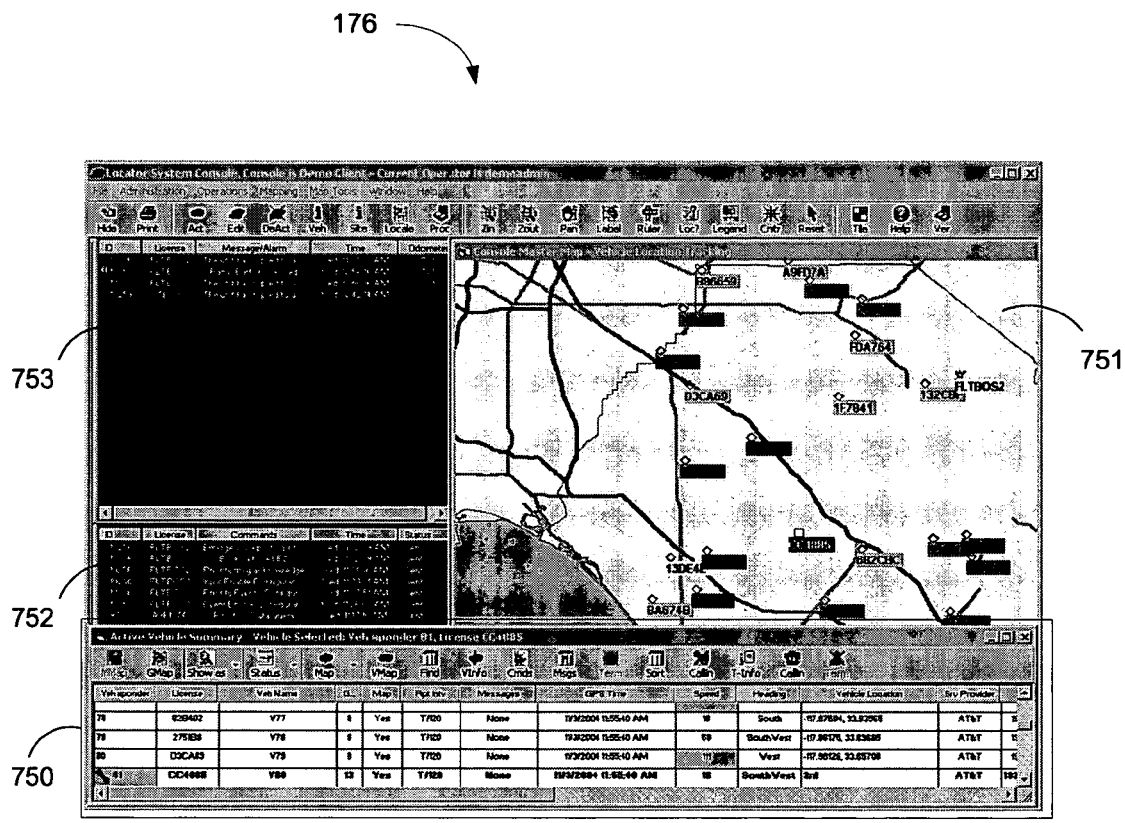
FIG. 7D illustrates a screenshot of an instance of a client console.

FIG. 7D illustrates a screenshot of the client console 176 with a generated list displaying a transponder summary table 750 and a master map 751. The client console also allows the user to view a chronological listing of all messages 752 received at the client console 176 and all commands 753 transmitted from the client console 176 to the transponder 105.

The transponder summary table 750 displays all transponder information and is updated in real time as the transponder reports to the client console 176. The transponder data shown are the data corresponding to the transponders belonging to the inventory of a user. The transponder summary table 750 uses icons and color-coding to alert the user to special conditions. Special situations that are color-coded include transponder moving, transponder stopped, transponder not reporting, transponder location is old and transponder has a priority message active. In another embodiment, the user has the ability to find any item in the transponder summary table 750, select which columns are visible and to sort the table according to selectable sort types and sort orders for up to three columns.

In another embodiment, the client console 176 provides a user the ability to select an item in the transponder summary table 750 and perform an operation that is related to the selected item or its group. For example if a transponder is selected, various operations related to the transponder may include adding the transponder to the master map, removing the transponder from the master map, creating a group map, creating an individual map, centering the map on the selected transponder location, viewing the input/output/and event states for the transponder, setting the message notification mode for the transponder, viewing an information screen that contains detailed information from the master database pertaining to the transponder and viewing any supplementary information contained in the location data packet that is not otherwise displayed.

In another embodiment, the client console 176 provides a user the ability to select a transponder in the transponder summary table 750 and send a command/query to the selected transponder. The command/query list available to the user is dependent on the user's profile in the master system database. In another embodiment, the command is sent from a web based client console such as the web tracking application 171.

In another embodiment, the client console 176 provides a user the ability to receive popup alert notification, including a sound cue, whenever a message event, a standard event or priority event is received at the client console 176. Notification modes may be enabled or disabled for each transponder. In one embodiment, the notification modes are configured in the fleet database 670. In another embodiment, the notification modes are configured locally in the client console 176. When a priority message is received, the user has the ability to cancel the message, switch reporting to the emergency mode, or continue to use the standard reporting mode. The transponder summary table 750 displays priority messages with a special icon under the transponder identification column.

Figure 8:
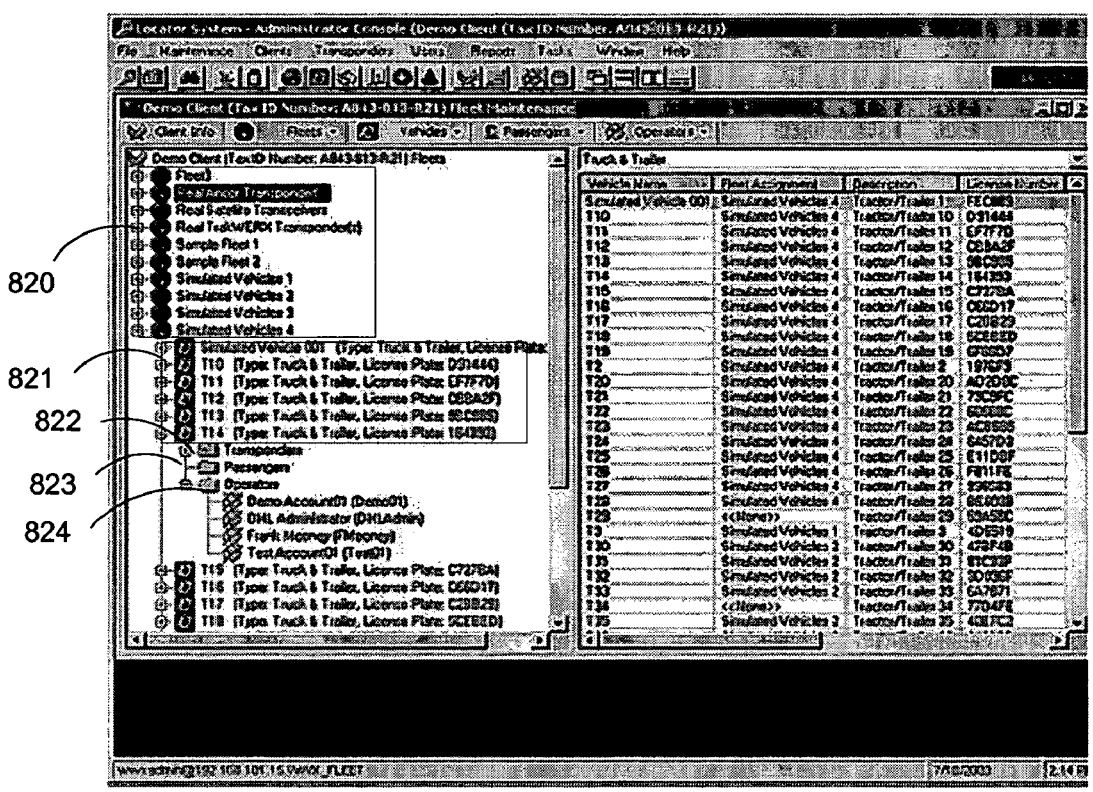
FIG. 8 illustrates a screenshot of an instance of the administrator console.

FIG. 8 illustrates a screenshot of an instance of the administrator console 175. The administrator console 175 allows the creation and maintenance of client configurations. The administrator console 175 updates the fleet database 670. As FIG. 7B illustrates, the administrator console 175 allows access to each fleet by displaying displays a list of fleets 820. Each fleet may be accessed to view and manage all the vehicles associated to the selected fleet. A list of vehicles 821 are associated with each fleet in the list of fleets 820. Each vehicle in the list of vehicles 821 has a corresponding list of transponders 822, passengers 823 and operators 824. Each transponder in the list of transponders 822 may be selected for configuration. Likewise, the list of operators 824 may be selected to add, edit or delete an operator. The list of passengers 823 may be selected to add, edit or delete a passenger for the corresponding vehicle.

Figure 9A:
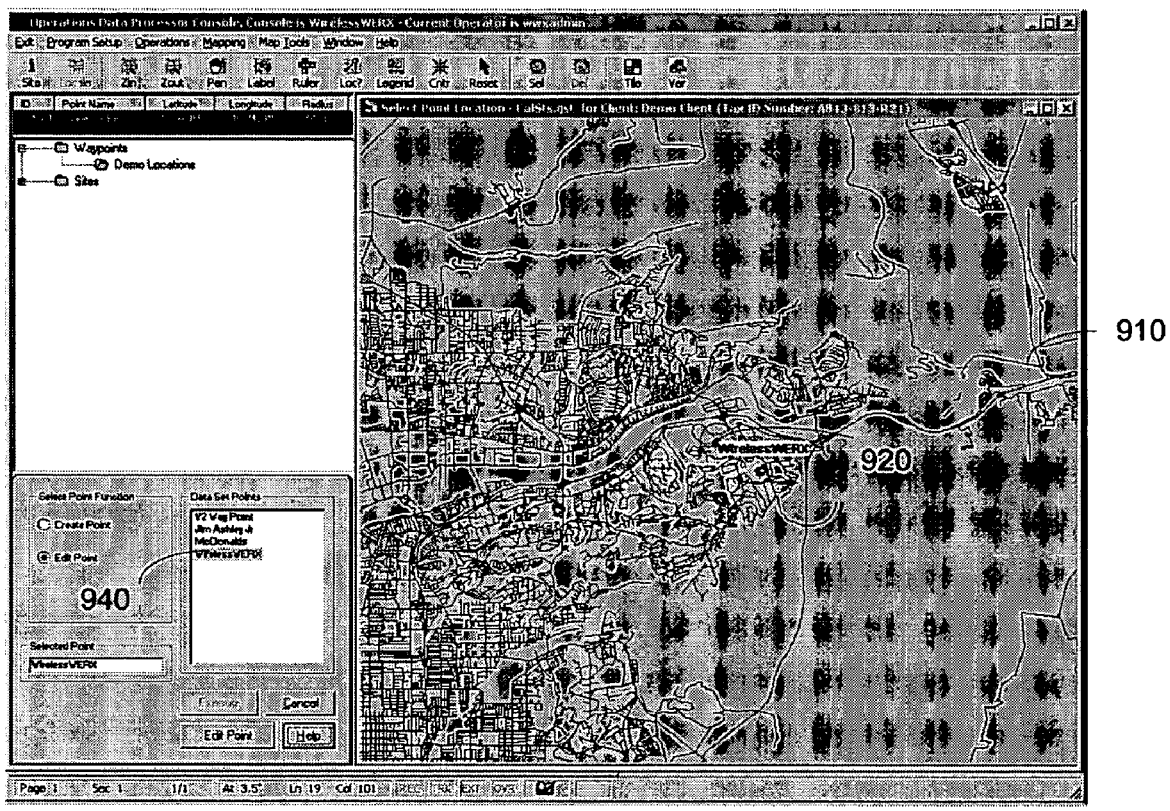
FIG. 9A illustrates a screenshot of an instance of the operations data processor.

FIG. 9A illustrates a screenshot of an instance of the operations data processor 173. The operations data processor 173 allows to create maintain zones, waypoints and transponder loads for the transponder 105. Zones, waypoints and sites are created and maintained with a point-and-click mapping interface as illustrated by FIG. 9A. The graphical interface provided by the operations data processor 173 displays a map 910 of the area where a waypoint 920 is to be installed. In one embodiment, the graphical interface allows to expand or reduce the radius 930 around the waypoint. In another embodiment, the radius information is entered by typing the number on a given field of the graphical user interface. The operations data processor 173 allows to maintain a list of waypoints 940 and view each waypoint 920 in a the corresponding map 910.

Figure 9B:
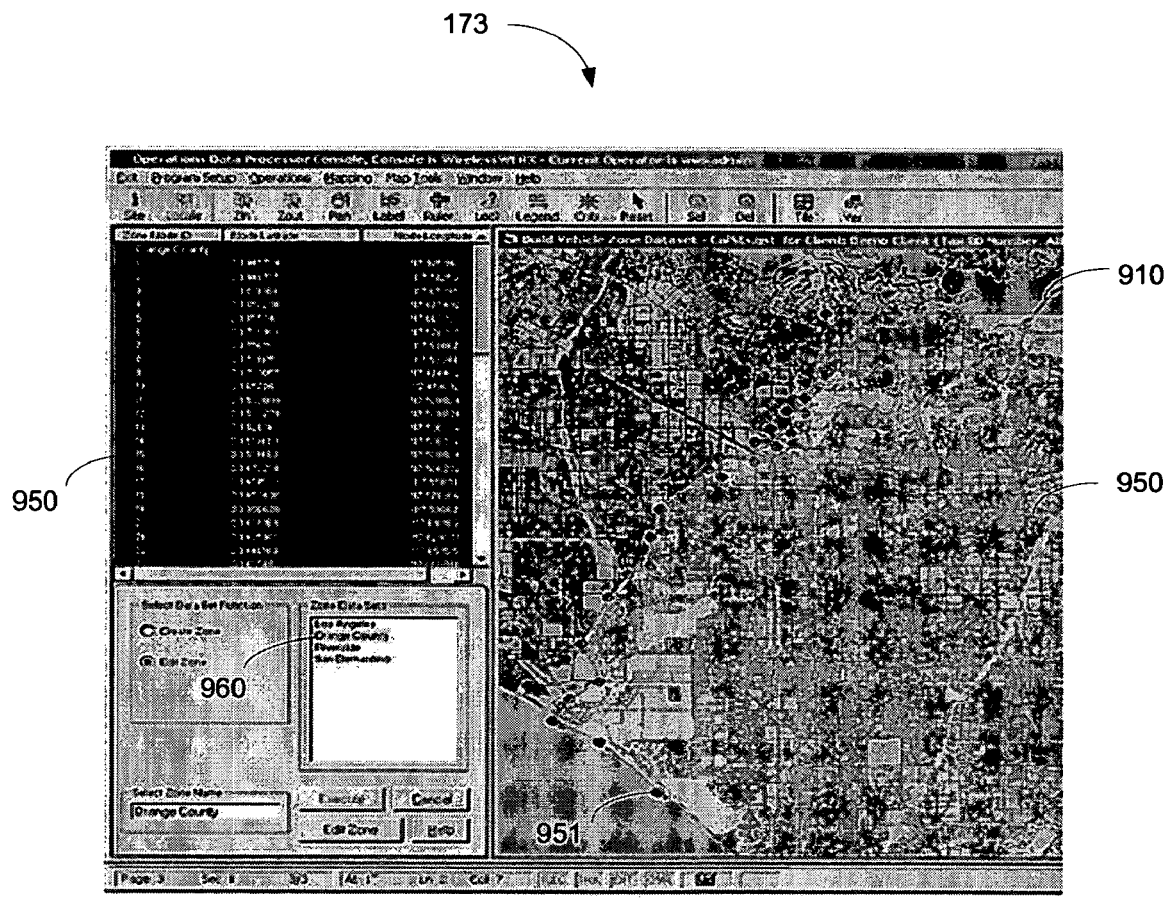
FIG. 9B illustrates a screenshot of an instance of the operations data processor.

FIG. 9B illustrates a screenshot of an instance of the operations data processor 173. The graphical interface provided by the operations data processor 173 displays a map 910 of the area where a zone 950 is to be delineated. The zone 950 is defined by deflection points 951 and the lines that connect the deflection points 951. The deflection points 951 may be indicated by clicking on the map 910. A list of zones 960 are also displayed by the operations data processor 173, along with a collection of deflection points 970. Each zone 950 can be edited by changing the deflection points 951.

Figure 9C:
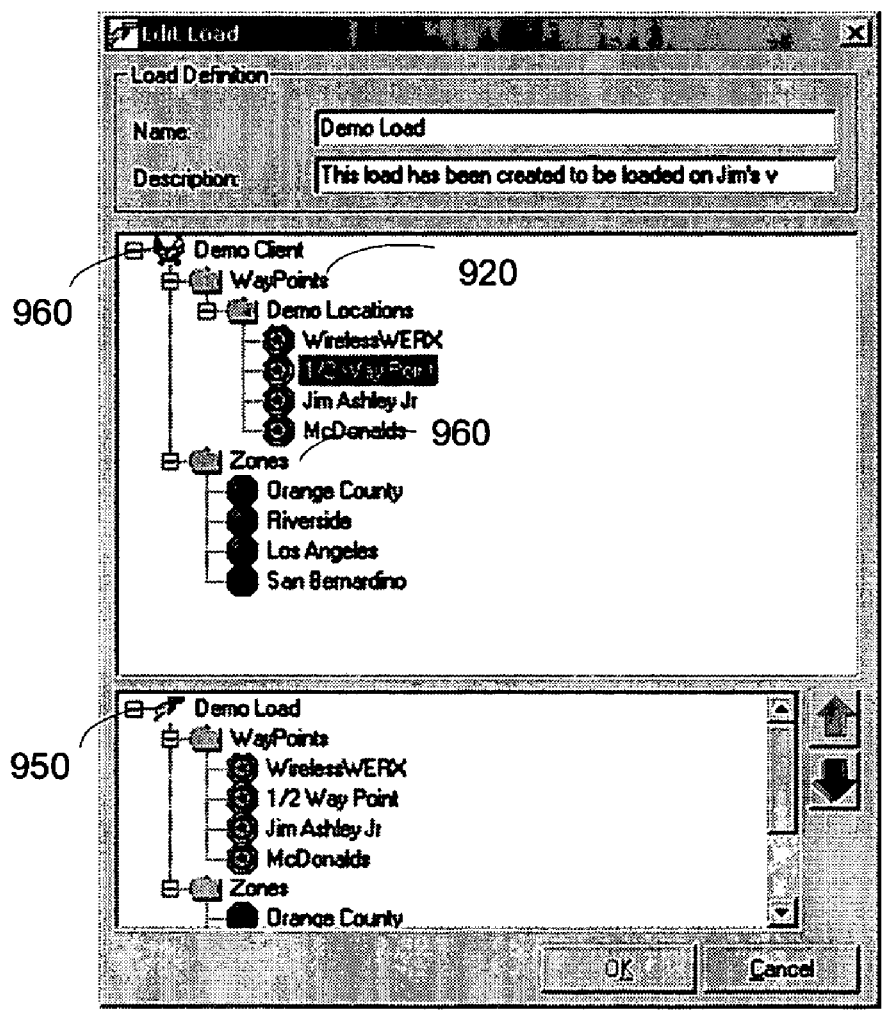
FIG. 9C illustrates a screenshot of an instance of the operations data processor.

FIG. 9C illustrates a screenshot of an instance of the operations data processor 173. The graphical interface provided by the operations data processor 173 displays a window to configure transponder loads. A transponder load is a collection of zones and waypoints to be loaded to a transponder. Each client edits a collection of transponder loads. The transponder loads are later downloaded to each transponder 105 according to the configuration in the fleet database 670. A load is configured by selecting a client 980, and selecting the desired waypoints 981 and zones 982 that were defined by the client 980. The waypoints 981 and zones 982 selected are those that will later be downloaded to the transponder 105.

Figure 10A:
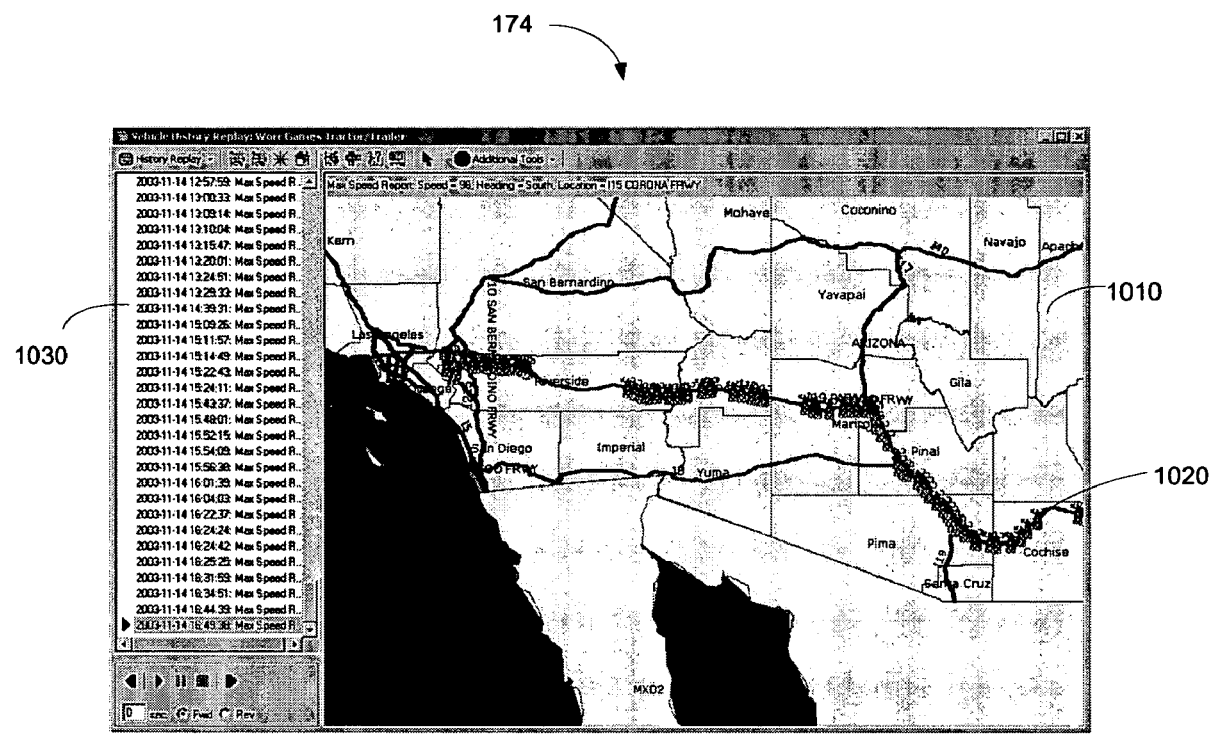
FIG. 10A illustrates a screenshot of an instance of the history data processor.

FIG. 10A illustrates a screenshot of an instance of the history data processor 173. The history data processor 173 permits the retrieving and mapping historical data and events associated with selected vehicles and transponders. The graphical user interface displays an interactive map 1010 and the geographical points 1020 where an event occurred. In one embodiment, the history data processor 173 allows the user to click on each geographical point 1020 and see the event information 1030 reported at that geographical point 1020. In another embodiment, the history data processor 173 allows the user to select a group of geographical points 1020 and replay the history of a transponder or of a vehicle along the selected geographical points 1020. In another embodiment, the history data processor 173 allows the user to select all geographical points 1020 and replay the history of a transponder or of a vehicle along the selected geographical points. In one embodiment, the history replay will replay the movement of the vehicle according to the streets traveled, the direction, and the speed. In another embodiment, as the history of the vehicle is replayed, the event information 1030 is displayed for every geographical point 1020 reached.

In another embodiment, the history replay can replay the history according to selected period. In another embodiment, the history replay can replay the history as related to a selected waypoint 920. In another embodiment, the history replay can replay the history as related to a selected zone 950.

Figure 10B:
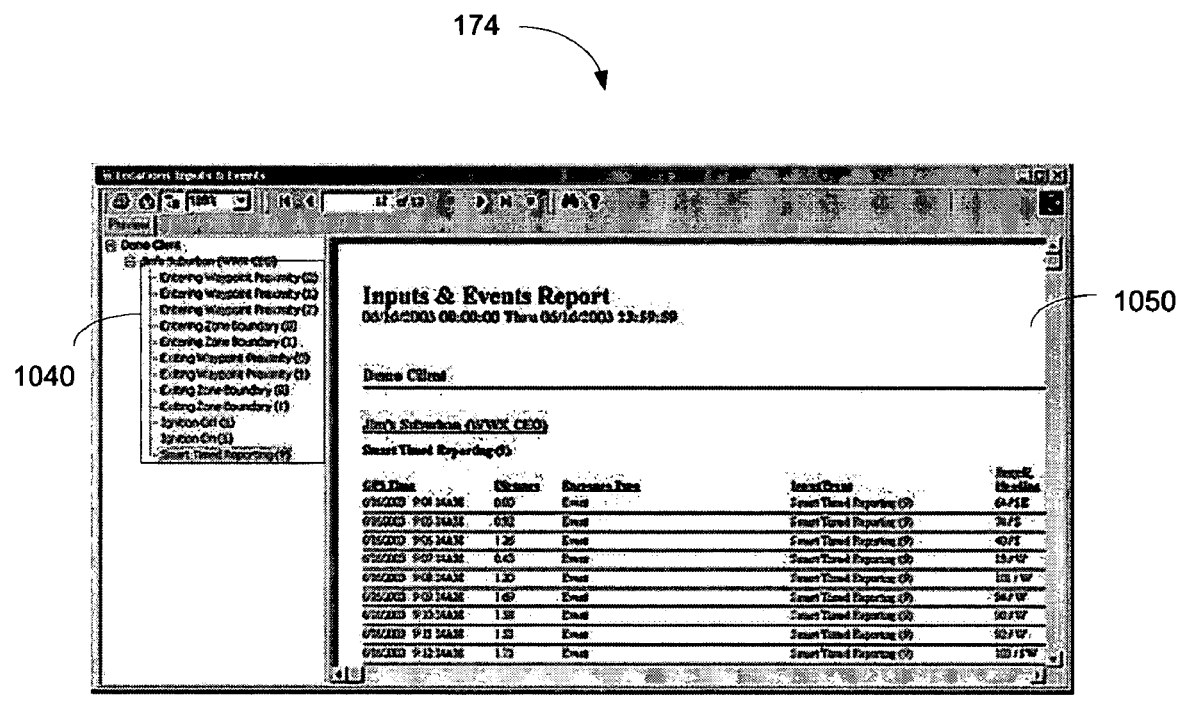

FIG. 10B illustrates a screenshot of an instance of the history data processor 173. The history data processor 173 also permits the retrieving and reporting mapping historical data and events associated with selected vehicles and transponders. In one embodiment, a graphical user interface form a computer application displays a list of available reports 1040. In another embodiment, a graphical user interface in a web browser displays a list of available reports 1040. Once an item in the list of available reports 1040 is selected, the report 1050 is displayed to the user. Each report 1050 is configurable to be generated based on multiple parameter options such as a time period, types of events, types of transponders, a specific transponder, a specific zone, a waypoint, types of vehicles, a vehicle, etc.

Figure 11:
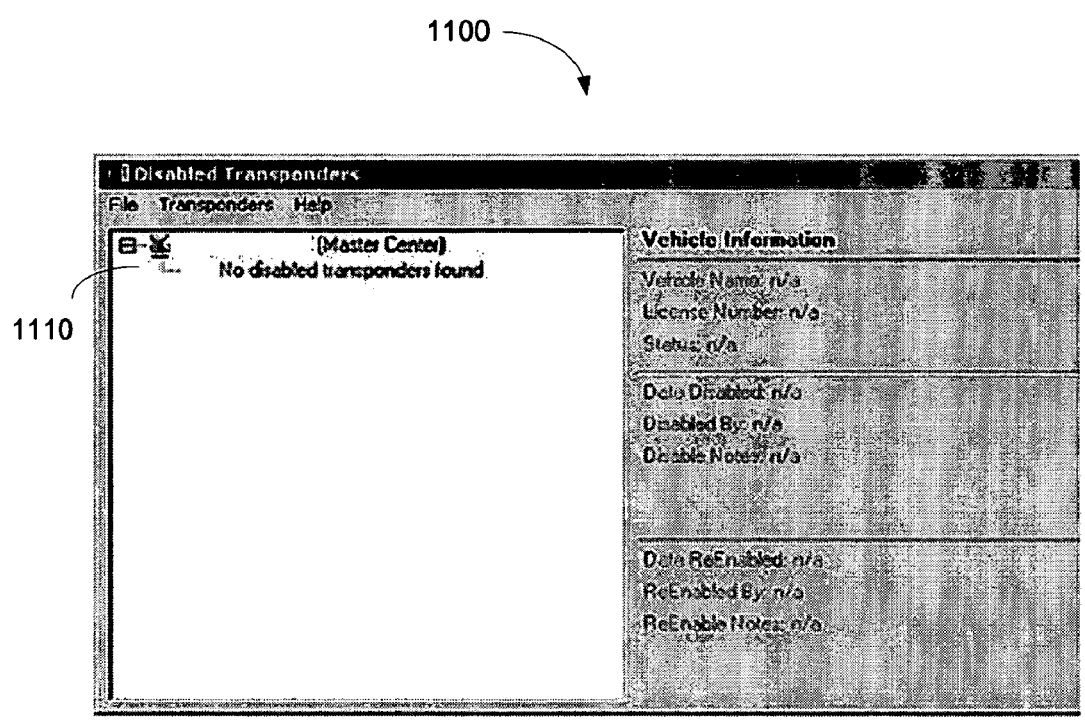
FIG. 11 illustrates a screenshot of an instance of a disable transponder processor.

FIG. 11 illustrates a screenshot of an instance of a disable transponder processor 1100. The disable transponder processor 1100 allows an accounting department to disable transponders 105 for nonpayment and enable them at the time of subscription or when payment is made. In one embodiment, a disable transponder processor 1100 can be connected to the accounting processing data exchange 177. In another embodiment the disable transponder processor 1100 can be a stand-alone application installed on computer systems used by an accounting department. In another embodiment the disable transponder processor 1100 can be a web application accessible only by members of an accounting department.

The disable transponder processor 1100 provides a list of transponders 1110 that are disabled, and a list of transponders that are enabled. If a user disbles or enables a transponder 105, the transponder configuration 105 is updated in the fleet database 670 and is also sent to the command receiver 690 for processing. The command receiver 690 sends a message to the transponder 105 to turn off its functions.

While the above description contains many specifics, these should not be construed as limitations on the scope of the disclosure, but rather as an exemplification of one embodiments thereof.

The method and system described above contemplate many applications of the present disclosure. The present disclosure includes a system which has the capability to control and monitor a moving object or a static object prone to be moved. The object can be many things such as vehicle, aircraft, airborne items, animals, persons, cargo, specialized and/or volatile cargo such as chemicals, weapons, or hazardous materials. In addition, fragile cargo can include, but is not limited to items such as, medicine, patients, organs for donation, where monitoring parameters such as temperature, pressure, humidity, blood pressure, ekg, and other conditions are critical to the integrity of the item. Another climate-sensitive object for which tracking, monitoring and local control is beneficial includes produce and perishable goods. For example, the transponder could monitor humidity and have the ability to control the amount of moisture in cargo containing perishable items that are susceptible to humidity. Moreover, these objects can include any other item where tracking its movement and/or location is beneficial. A transponder can be mounted, attached, manufactured, or otherwise included upon or within these various articles. The transponder is contemplated to be of many different sizes including nano- and/or micro scale-transponder. Within the context of the tracking system, the transponder works to collect, process, and communicate various information about the article or vehicle the transponder is attached to. Furthermore, when requested, the transponder can issue various commands and instructions to the local article or vehicle. These commands or instructions to the local article or vehicle are contemplated to include any command that can change, alter, or enhance, the mechanism, the function, the structure or the composition of the article or vehicle. For example, a medical application of the present disclosure contemplates a transponder with the ability to monitor a patient's vital signs. The transponder can be hardwired or hooked up to intravenous tubes, medical machines, and other medical equipment. Thus, for example, the user is capable of remotely administering medicine by commanding the transponder to perform the function. Furthermore, a change in vital signs could send an event message to the transponder where the transponder could send a message to a response center or directly to a cellular phone of the patient's physician or to a plurality of cellular phones, such as to family members, for example.

Additional applications and situations include military applications where it is necessary to not only track and monitor a vehicle or person, but where it is also beneficial to be able to control functions on the vehicle or person. For example, it may be desired to control the firing ability of a military vehicle, or control similar functions once the vehicle enters a certain territory or turn off certain capabilities once the vehicle enters a peaceful zone. Similarly, an additional application to aircrafts and airborne items considered. The transponder would have the same capabilities; however, the transponder could position based upon on a 3-D point in space, not merely longitude and latitude. Naturally, each one of these applications remains configurable and controllable over-the-air.

Furthermore, the disclosure includes any combination or subcombination of the elements from the different species and/or embodiments disclosed herein. One skilled in the art will recognize that these features, and thus the scope of this disclosure, should be interpreted in light of the following claims and any equivalents thereto.

We claim:

1. A method to wirelessly monitor an entity having an attached transponder, comprising:
   loading from a computing device to a memory in an attached transponder a plurality of coordinates;
   programming a microprocessor in the attached transponder to define a geographical zone using said plurality of coordinates to create an enclosed area on a pixilated image, wherein said enclosed area is representative of a geographical zone;
   programming the microprocessor in the attached transponder to determine the occurrence of an event associated with the status of the entity in relation to the geographical zone; and
   configuring the microprocessor in the transponder to transmit the data related to the occurrence of an event from the attached transponder to a user.

2. The method of claim 1, wherein the status of the entity is based upon movement of the entity.

3. The method of claim 1, wherein the status of the entity is based upon position of the entity.

4. The method of claim 1, wherein the status of the entity is based upon non-movement of the entity.

5. The method of claim 1, wherein the event is leaving a geographical zone, entering a geographical zone, turning on an ignition to the entity, turning off the ignition to the entity, change of speed of the entity, change of temperature of an engine of the entity, change of internal temperature of the entity, change of fuel level in a fuel tank of the entity, locking of a door or latch of the entity, unlocking of the door or latch of the entity, opening a window of the entity, closing a window of the entity, opening a door of the entity, closing of a door of the entity, pushing a button connected to the entity in relation to an emergency, reaching a predetermined distance traveled, reaching a predetermined time traveled, reaching a predetermined time, reaching a predetermined date, reaching a maximum speed threshold, reaching a maximum time permitted to maintain a status of being over the speed threshold, reaching a maximum a acceleration threshold, reaching maximum length of idle of a vehicle, change of the power level of the battery, a bar code scanned by a connected scanner, passenger loading or unloading, cargo loading or unloading, vehicle part malfunction, vehicle diagnostics code received, impact detected, airbag deployed, seatbelts latched, seatbelts unlatched, or change of tire air pressure.

6. The method of claim 1, wherein the data transmitted from the attached transponder is the speed of the entity, direction of movement of the entity, state of an electrical input to the entity, state of an electrical output of the entity, or geographical position of the entity.

7. The method of claim 1, wherein the data transmitted from the attached transponder is communicated to a control center.

8. The method of claim 1, further comprising communicating the occurrence of the event to a portable device.

9. The method of claim 8, wherein data communicated to the control center is further communicated to a portable device.

10. The method of claim 1, wherein said enclosed area on a pixilated image is formed by assigning each pixel is to a coordinate and configuring the distance between each assigned pixel.

11. The method of claim 1, wherein said enclosed area is created by connecting a plurality of assigned pixels by lines, wherein a series of contiguous and connected lines enclose an area in the pixilated image and wherein said pixels that lie on the lines are turned on in order to form a contiguous array of pixels that enclose a shape in the pixilated image.

12. A method to wirelessly monitor an entity having an attached transponder, comprising:
   defining a geographical zone using a plurality of waypoints, wherein each waypoint is defined by a geographical coordinate and a radius originating from the geographical coordinate;
   loading from a computing device to the attached transponder's memory a plurality of waypoints;
   programming a microprocessor in the attached transponder to determine the occurrence of an event associated with the position of the entity in relation to the geographical zone; and configuring the microprocessor in the transponder to transmit the data related to the occurrence of an event from the attached transponder to a user.

13. The method of claim 12, wherein the status of the entity is based upon movement of the entity.

14. The method of claim 12, wherein the status of the entity is based upon position of the entity.

15. The method of claim 12, wherein the status of the entity is based upon non-movement of the entity.

16. The method of claim 12, wherein the event is leaving a geographical zone, entering a geographical zone, turning on an ignition to the entity, turning off the ignition to the entity, change of speed of the entity, change of temperature of an engine of the entity, change of internal temperature of the entity, change of fuel level in a fuel tank of the entity, locking of a door or latch of the entity, unlocking of the door or latch of the entity, opening a window of the entity, closing a window of the entity, opening a door of the entity, closing of a door of the entity, pushing a button connected to the entity in relation to an emergency, reaching a predetermined distance traveled, reaching a predetermined time traveled, reaching a predetermined time, reaching a predetermined date, reaching a maximum speed threshold, reaching a maximum time permitted to maintain a status of being over the speed threshold, reaching a maximum a acceleration threshold, reaching maximum length of idle of a vehicle, change of the power level of the battery, a bar code scanned by a connected scanner, passenger loading or unloading, cargo loading or unloading, vehicle part malfunction, vehicle diagnostics code received, impact detected, airbag deployed, seatbelts latched, seatbelts unlatched, or change of tire air pressure.

17. The method of claim 12, wherein the data transmitted from the attached transponder is the speed of the entity, direction of movement of the entity, state of an electrical input to the entity, state of an electrical output of the entity, or geographical position of the entity.

18. The method of claim 12, wherein the data transmitted from the attached transponder is communicated to a control center.

19. The method of claim 18, wherein the data communicated to the control center is further communicated to a portable device.

20. The method of claim 12, wherein the geographical coordinate is represented by a latitude and longitude, and the radius is represented by a distance magnitude.

21. The method of claim 20, wherein the attached transponder can determine whether the attached transponder is inside or outside the geographical zone by obtaining global positioning coordinates, and calculating whether or not the global positioning coordinates are inside at least one waypoint of the plurality of waypoints.

22. The method of claim 20, wherein the shape of the geographical area is the shape of the border delimiting a street route, a state, a city, a county, or a country.

23. The method of claim 20, wherein shape of the geographical area is the shape of a non-geometrical shape.

24. The method of claim 20, wherein the waypoints in the plurality of waypoints have the same coordinate but different radii, such that all the waypoints in the plurality of waypoints are concentric.

25. A method to wirelessly monitor an entity having an attached transponder, comprising:

using a computing device to identify a geometrical area using at least two coordinate attributes, wherein said geometrical area is divided into a grid having at least one section;

defining a geographical zone by selecting within the grid the at least one section representative of a desired area and correlating at least one section into a pixilated computer image by associating at least one section to a pixel;

loading said pixilated computer image into the attached transponder's memory;

programming a microprocessor in the attached transponder to determine the occurrence of an event associated with the position of the entity in relation to the geographical zone; and configuring the microprocessor in the transponder to transmit the data related to the occurrence of an event from the attached transponder to a user.

26. The method of claim 25, wherein the status of the entity is based upon movement of the entity.

27. The method of claim 25, wherein the status of the entity is based upon position of the entity.

28. The method of claim 25, wherein the status of the entity is based upon non-movement of the entity.

29. The method of claim 25, wherein the event is leaving a geographical zone, entering a geographical zone, turning on an ignition to the entity, turning off the ignition to the entity, change of speed of the entity, change of temperature of an engine of the entity, change of internal temperature of the entity, change of fuel level in a fuel tank of the entity, locking of a door or latch of the entity, unlocking of the door or latch of the entity, opening a window of the entity, closing a window of the entity, opening a door of the entity, closing of a door of the entity, pushing a button connected to the entity in relation to an emergency, reaching a predetermined distance traveled, reaching a predetermined time traveled, reaching a predetermined time, reaching a predetermined date, reaching a maximum speed threshold, reaching a maximum time permitted to maintain a status of being over the speed threshold, reaching a maximum a acceleration threshold, reaching maximum length of idle of a vehicle, change of the power level of the battery, a bar code scanned by a connected scanner, passenger loading or unloading, cargo loading or unloading, vehicle part malfunction, vehicle diagnostics code received, impact detected, airbag deployed, seatbelts latched, seatbelts unlatched, or change of tire air pressure.

30. The method of claim 25, wherein the data transmitted from the attached transponder is the speed of the entity, direction of movement of the entity, state of an electrical input to the entity, state of an electrical output of the entity, or geographical position of the entity.

31. The method of claim 25, wherein the data transmitted from the attached transponder is communicated to a control center.

32. The method of claim 31, wherein the data communicated to the control center is further communicated to a portable device.

33. The method of claim 25, wherein said geometrical area is rectangular and is divided into a plurality of rectangles.

34. The method of claim 25, wherein said geometrical area is circular and is divided into a plurality of sections.

* * * * *